US009651845B2

(12) United States Patent
Gillaspie et al.

(10) Patent No.: US 9,651,845 B2
(45) Date of Patent: *May 16, 2017

(54) ELECTROCHROMIC NICKEL OXIDE SIMULTANEOUSLY DOPED WITH LITHIUM AND A METAL DOPANT

(71) Applicants: SAGE Electrochromics, Inc., Faribault, MN (US); Alliance for Sustainable Energy, LLC, Golden, CO (US)

(72) Inventors: Dane T. Gillaspie, Fremont, CA (US); Douglas Glenn John Weir, Northfield, MN (US)

(73) Assignees: SAGE ELECTROCHROMICS, INC., Faribault, MN (US); ALLIANCE FOR SUSTAINABLE ENERGY, LLC, Golden, CO (US)

( * ) Notice: Subject to any disclaimer, the term of this patent is extended or adjusted under 35 U.S.C. 154(b) by 494 days.

This patent is subject to a terminal disclaimer.

(21) Appl. No.: 14/031,573

(22) Filed: Sep. 19, 2013

(65) Prior Publication Data

US 2014/0016173 A1    Jan. 16, 2014

Related U.S. Application Data

(63) Continuation of application No. 13/554,144, filed on Jul. 20, 2012, now Pat. No. 8,687,261.
(Continued)

(51) Int. Cl.
*G02F 1/15* (2006.01)
*G02F 1/155* (2006.01)
*C09K 9/00* (2006.01)

(52) U.S. Cl.
CPC ............ *G02F 1/155* (2013.01); *C09K 9/00* (2013.01); *G02F 1/1523* (2013.01)

(58) Field of Classification Search
CPC ......... C09K 9/00; G02F 1/1523; G02F 1/155; G02F 1/1525; G02F 2001/1536; G02F 2001/1555; Y10T 29/49115; Y02P 70/54
(Continued)

(56) References Cited

U.S. PATENT DOCUMENTS 5,277,986 A    1/1994  Cronin et al.
5,699,192 A   12/1997  Van Dine et al.
(Continued)

FOREIGN PATENT DOCUMENTS

JP    H1030181 A    2/1998
JP    2006235632 A  9/2006
(Continued)

OTHER PUBLICATIONS

European Search Report for Application No. EP06003692, dated May 19, 2006, 9 pages.
(Continued)

*Primary Examiner* — Scott J Sugarman
*Assistant Examiner* — Mustak Choudhury
(74) *Attorney, Agent, or Firm* — Abel Law Group, LLP; Robert N. Young

(57) ABSTRACT

An electrochromic device comprising a counter electrode layer comprised of lithium metal oxide which provides a high transmission in the fully intercalated state and which is capable of long-term stability, is disclosed. Methods of making an electrochromic device comprising such a counter electrode are also disclosed.

20 Claims, 18 Drawing Sheets

Related U.S. Application Data

(60) Provisional application No. 61/510,381, filed on Jul. 21, 2011.

(58) Field of Classification Search
USPC ........ 359/265–275; 423/594.2, 594.4, 594.6, 423/594.8, 594.12, 598; 427/77, 523, 427/524, 529; 429/188, 496; 252/582–589
See application file for complete search history.

(56) References Cited

U.S. PATENT DOCUMENTS

| | | | |
|---|---|---|---|
| 6,094,292 | A | 7/2000 | Goldner et al. |
| 6,277,523 | B1* | 8/2001 | Giron .................... G02F 1/1525 429/304 |
| 6,859,297 | B2 | 2/2005 | Lee et al. |
| 2001/0031403 | A1 | 10/2001 | Giron |
| 2003/0227663 | A1 | 12/2003 | Agrawal et al. |
| 2004/0150867 | A1 | 8/2004 | Lee et al. |
| 2004/0155263 | A1 | 8/2004 | Giron |
| 2006/0028730 | A1 | 2/2006 | Varaprasad et al. |
| 2006/0209383 | A1 | 9/2006 | Burdis et al. |
| 2007/0160907 | A1 | 7/2007 | Jang et al. |
| 2009/0057137 | A1 | 3/2009 | Pitts et al. |
| 2010/0014145 | A1* | 1/2010 | Jang .................... G02F 1/1506 359/265 |
| 2010/0243427 | A1 | 9/2010 | Kozlowski et al. |
| 2011/0151283 | A1 | 6/2011 | Gillaspie et al. |

FOREIGN PATENT DOCUMENTS

| | | |
|---|---|---|
| JP | 2009522613 A | 6/2009 |
| JP | 2012523019 A | 9/2012 |
| WO | 2009029111 A1 | 3/2009 |

OTHER PUBLICATIONS

Gillaspie, Dane et al., "Nanocomposite Counter Electrode Materials for Electrochromic Windows," Journal of the Electrochemical Society, vol. 157, No. 3, daged Jan. 20, 2010, pp. H328-H331.
Gillaspie, Dane T. et al., "Metal-Oxide Films for Electrochromic Applications: Present Technology and Future Directions," Journal of Materials Chemistry, vol. 20, No. 43, dated Jan. 10, 2010, pp. 9585-9592.
International Search Report and Written Opinion for Application No. PCT/US2013/053934, dated Apr. 23, 2014, 27 pages.
Tateishi, Kenji et al., "LiMn2O4: A Spinel-Related Low-Temperature Modification," Acta Crystallographica Section E, Structure Reports Online, vol. 60, No. 2, dated Jan. 17, 2004, pp. i18-i21.
Lim, SunHye et al., "PVP-Assisted ZrO2 Coating on LiMn2O4 Spinel Cathode Nanoparticles Prepared by MnO2 Nanowire Templates," Electrochrmistry Communications, Elsevier, vol. 10, dated Oct. 1, 2008, pp. 1478-1481.
Monk, Paul M. S. et al., "Electrochromism: Fundamentals and Appplications," dated 1995, VCH, Federal Republic of Germany, XP002718689, pp. 78-91.
Monk, Paul M. S. et al., "Electrochromic Tungsten Oxide: Doping with Two or Three Other Metal Oxides," Journal of Materials Chemistry, vol. 4, No. 7, dated 1994, pp. 1071-1074.

Answer, Affirmative Defenses, and Counterclaims of defendant—Counterclaimant View, Inc. filed Feb. 11, 2013, Case3:12-cv-06441-SI.
C. Pouillerie et al, "Effect of magnesium substitution on the cycling behavior of lithium nickel cobalt oxide", Journal of Power Sources, vol. 96, 2001, pp. 293-302, XP002682874.
Complaint for Patent Infringement and Injunctive Relief—*Sage Electrochromics, Inc.* vs *View Inc.*, Filed Dec. 20, 2012, Case No. C 12 6441.
Defendant-Counterclaimant View, Inc.'s Answer to Plaintiff and Counterclaim-Defendant Sage Electrochronnics, Inc.'s Counterclaims, Case No. C-12-6441 (JST), Filed Apr. 15, 2013.
European Search Report for Application EP06003692 dated May 9, 2006.
First Amended Answer, Affirmative Defenses, and Counterclaims of Defendant-Counterclaimant View, Inc., filed Mar. 4, 2013, Case3:12-cv-06441-JST.
International Search Report for Application No. PCT/US2012/047569 dated Sep. 19, 2012.
J. Kim, K. Amine, "A comparative study on the substitution of divalent. trivalent and tetravalent metal ions in LiNi1—xMx02 (M=Cu2+. Al3+ and Ti4+)", Journal of Power Sources, vol. 104, 2002, pp. 33-39, XP002682875.
J.B. Wu et.al., "Analysis of AC electrical properties of (Li and Ti)-doped NiO", Materials Science and Engineering B, vol. 99, 2003, pp. 294-297. XP002682872.
Kaufman, H.R. et al., Sputtering, J. Vac. Sci. Techn. 21, 725 (1982).
Lee, S.-H. et al., "Electrochromic behavior of Ni—W oxide electrodes," Solar energy Materials and Solar Cells 39 (1995) 155-166.
Lee, Se-Hee et al., "A New Lithium Based Counter Electrochromic Material for Fast Optical Response," Electrochemical Society Proceedings vol. 96-24, pp. 191-205, San Antonio, TX (1996).
Lee, Se-Hee et al., "Characterization of Ni—W oxide thin film electrodes," Solid State Ionics 109 (1998) 303-310.
Lee, Se-Hee et al., "Electrochromic mechanism in a-WO3-y thin films," Applied Physics Letters, American Institute of Physics (Jan. 11, 1999), pp. 242-244.
Lee, Se-Hee et al., "Raman spectroscopic studies of Ni—W oxide thin films," Solid State Ionics 140 (2001) 135-139.
Passerini S et al., "The Intercalation of Lithium in Nickel Oxide and Its Electrochromic Properties", Journal of the Electrochemical Society, ECS, vol. 137, No. 10, Oct. 1, 1990 (Oct. 1, 1990). pp. 3297-3300, XP000237466.
Plaintiff and Counterclaim-Defendant Sage Electrochromics, Inc.'s Answer to Defendant and Counterclaimant View, Inc.'s First Amended Counterclaims, Affirmative Defenses, and Counterclaims, Case No. C 12-06441 (JST), filed Mar. 21, 2013.
Scrosati, B., "1st International Meetng on Electrochromism (IME-1), Murano-Venice, Oct. 19-21, 1994", Solar Energy Materials and Solar Cells 39(1995) 111-113.
Svegl F et al., "Electrochromic properties of lithiated Co-oxide (LixCoO2) and Ni-oxide (LixNiO2) thin films prepared by the sol-gel route", Solar Energy, Pergamon Press. Oxford, GB, vol. 68, No. 6, Jan. 1, 2000 (Jan. 1, 2000). pp. 523-548, XP004198077.
Yan Daong et al., "Microstructure and dielectric properties of LiTiNiO thin films", Key Engineering Materials, vol. 336-338, 2007, pp. 2635-2638, XP009162456.
Z. Lu. J.R. Dahn, "Understanding the anomalous capacity of Li/Li [NixLi (1/3-2x/3)Mn(2/3-x/3]O2 cells using in situ X-ray diffraction and electrochemical studies", Journal of the Electrochemical Society, vol. 149, 2002, pp. A815-A822, XP002682873.

* cited by examiner

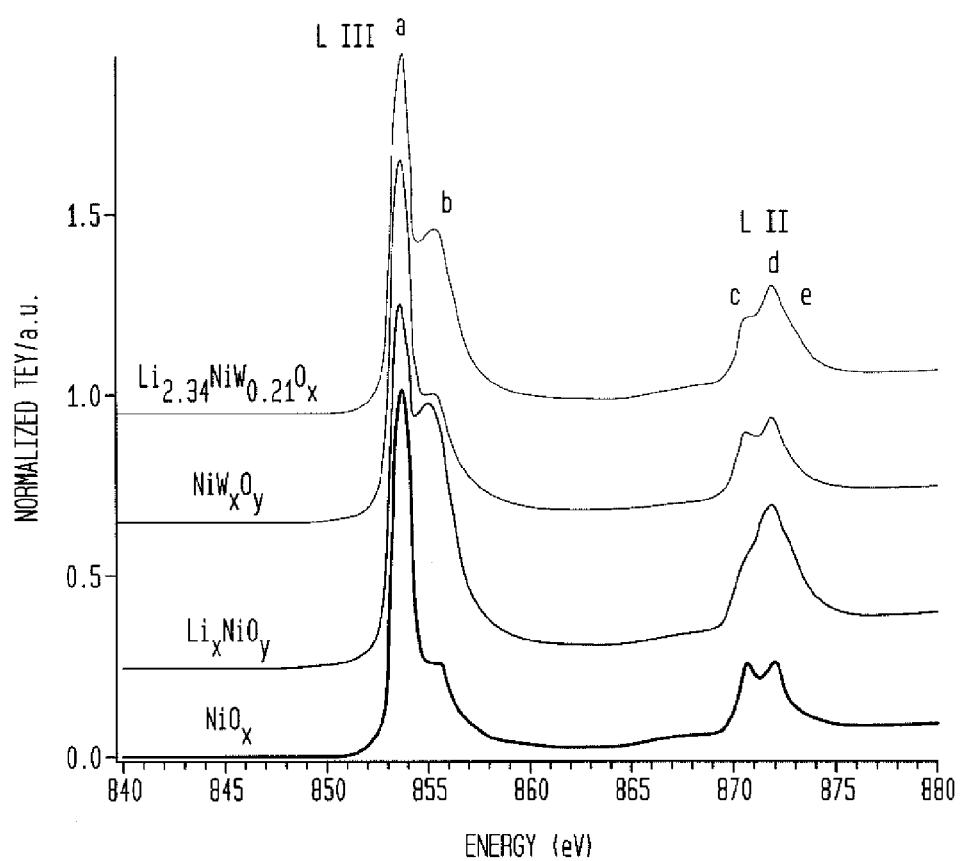

ELECTROCHROMIC NICKEL OXIDE SIMULTANEOUSLY DOPED WITH LITHIUM AND A METAL DOPANT

CROSS-REFERENCE TO RELATED APPLICATIONS

The present application is a continuation of U.S. patent application Ser. No. 13/554,144, filed on Jul. 20, 2012, which claims the benefit of the filing date of U.S. Provisional Patent Application No. 61/510,381, filed Jul. 21, 2011, the disclosures of which are hereby incorporated herein by reference.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Certain materials, referred to as electrochromic materials, are known to change their optical properties in response to the application of an electrical potential. This property has been taken advantage of to produce electrochromic devices which can be controlled to transmit optical energy selectively.

A number of factors affect the operation of an electrochromic device. One limitation on how dark an electrochromic device can become is how much charge can be stored in the counter electrode layer. In this context, the term, "charge," refers to the amount of electronic charge, or quantity of electrons per unit area, and the equivalent, corresponding quantity of charge balancing lithium ions per unit area, which may be conveniently expressed in units of milliCoulombs per square centimeter ($mC/cm^2$). There have been many different approaches for producing a charge storage medium, but most attention has focused on a thin film deposited parallel to the electrochromic material layer, and separated by an ionically conductive layer.

To date, most counter electrode layers have been made using NiO, LiNiO, or doped variants thereof. One advantage of using NiO and LiNiO materials is that under careful preparation conditions, the counter electrode can be made so that it displays anodic electrochromism with good electrochromic efficiency and a high bleached state light transmission. Here, the term, "electrochromic efficiency" refers to the modulation of optical density per amount of charge transferred per unit area. Unfortunately, it has been difficult to intercalate lithium into NiO based materials as a result of the material's compact crystalline structure. As such, higher voltages must be applied to such materials to intercalate lithium, in order to drive the electrochromic response at a reasonably fast rate, which leads to undesirable side reactions.

Other methods employ protons, or hydrogen ions instead of lithium ions, as the charge balancing counter ion for the coloration mechanism. These methods may use counter electrode layers comprised of nickel hydroxides, or iridium oxides and other mixtures containing iridium. Typically an aqueous medium is also required to provide a suitable source of protons. Although it may be relatively easy to manufacture a counter electrode layer capable of coloring anodically in an aqueous medium, it is difficult to produce a complete device capable of long-term stability. It is, therefore, more advantageous to use lithium intercalation based systems.

A typical material used for counter electrode applications with lithium is vanadium oxide, which is a material that forms crystal structures similar to those seen in tungsten oxide systems. The open crystalline lattice of vanadium oxide allows lithium intercalation more readily than in NiO based structures. However, the presence of vanadium ions leads to the generation of a strong yellow color. This yellow color is only slightly modulated by lithium intercalation, and shows a reasonable cathodic electrochromic effect throughout the majority of the visible region, thus limiting the maximum transmission that can be achieved using this material as a counter electrode layer. Attempts to reduce the degree of coloration by doping vanadium oxides with other components result in a reduced electrochromic efficiency by reduction of the charge capacity of the counter electrode layer. Such doping results in a device with a higher bleached state transmission at the cost of decreased range of modulation of optical density.

There remains a need for improved electrochromic coatings, and in particular electrochromic coatings that comprise solid state, inorganic thin films, and metal oxide or metal oxide-containing thin films.

The foregoing examples of the related art and limitations related therewith are intended to be illustrative and not exclusive. Other limitations of the related art will become apparent to those of skill in the art upon a reading of the specification and a study of the drawings.

BRIEF SUMMARY OF THE INVENTION

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

Exemplary embodiments describe an electrochromic device comprising a counter electrode comprised of a mixed oxide. In some embodiments, the electrochromic device is comprised of five sequential layers including two conductive layers, an electrochromic layer, an ion conductor layer, and a counter electrode layer.

An embodiment, by way of non-limiting examples, includes an electrochromic device comprising: (a) a first electrode comprising one of an electrochromic layer or a counter electrode layer, (b) a second electrode comprising the other of the electrochromic layer or the counter electrode layer, (c) an ion-conductor layer for conducting ions between the first and second electrodes, (d) a first conductive layer, and (e) a second conductive layer, the first and second electrodes and the ion-conductor layer being sandwiched between the first and second conductive layers, the counter electrode layer comprising at least one mixed oxide having a formula $Li_xNi(II)_{1-y}Ni(III)_yM_zO_a$, where M is a metal, and x is about 0 to about 10, y is about 0 to about 1, z is about 0 to about 10, and a is from about $(0.5x+1+0.5y+z)$ to about $(0.5x+1+0.5y+3.5z)$.

In some embodiments, the mixed oxide has the formula $Li_xNi(II)_{(1-y)}Ni(III)_{(y)}M(A)_zO_{(1+0.5x+0.5y+1.5z)}$, where A is the oxidation state of the metal M. In some embodiments, M(A) is selected from the group consisting of Al(III), Sc(III), Cr(III), Co(III), Y(III), Rh(III), In(III), La(III), Ce(III), Nd(III), and Sm(III).

In some embodiments, the mixed oxide has the formula $Li_xNi(II)_{(1-y)}Ni(III)_{(y)}M(A)_zO_{(1+0.5x+0.5y+2z)}$, where A is the oxidation state of the metal M. In some embodiments, M(A) is selected from the group consisting of Si(IV), Ti(IV), Mn(IV), Zr(IV), Sn(IV), Ce(IV), Hf(IV), Re(IV), and Ir(IV).

In some embodiments, the mixed oxide has the formula $Li_xNi(II)_{(1-y)}Ni(III)_{(y)}M(A)_zO_{(1+0.5x+0.5y+2.5z)}$, where A is the oxidation state of the metal M. In some embodiments, M(A) is selected from the group consisting of V(V), Nb(V), Sb(V), Ta(V), and Pa(V).

In some embodiments, the mixed oxide has the formula $Li_xNi(II)_{(1-y)}Ni(III)_{(y)}M(A)_zO_{(1+0.5x+0.5y+3z)}$, where A is the oxidation state of the metal M. In some embodiments, M(A) is selected from the group consisting of Cr(VI), Se(VI), Mo(VI), Te(VI), and W(VI).

In some embodiments, the mixed oxide is $Li_{2.3}Ni(II)_{(0.5)}Ni(III)_{(0.5)}Y(III)_{0.3}O_a$, where a is as defined herein. In some embodiments, the mixed oxide is $Li_{2.3}Ni(II)_{(0.5)}Ni(III)_{(0.5)}Y(III)_{0.3}O_{3.1}$.

In some embodiments, the mixed oxide is $Li_{2.3}Ni(II)_{(0.5)}Ni(III)_{(0.5)}Zr(IV)_{0.3}O_a$, where a is as defined herein. In some embodiments, the mixed oxide is $Li_{2.3}Ni(II)_{(0.5)}Ni(III)_{(0.5)}Zr(IV)_{0.3}O_{3.25}$.

In some embodiments, the mixed oxide is $Li_{2.3}Ni(II)_{(0.5)}Ni(III)_{(0.5)}Hf(IV)_{0.3}O_a$, where a is as defined herein. In some embodiments, the mixed oxide is $Li_{2.3}Ni(II)_{(0.5)}Ni(III)_{(0.5)}Hf(IV)_{0.3}O_{3.25}$.

In some embodiments, the mixed oxide is $Li_{2.3}Ni(II)_{(0.5)}Ni(III)_{(0.5)}Zr(IV)_{0.294}Hf(IV)_{0.006}O_a$, where a is as defined herein. In some embodiments, the mixed oxide is $Li_{2.3}Ni(II)_{(0.5)}Ni(III)_{(0.5)}Zr(IV)_{0.294}Hf(IV)_{0.006}O_{3.25}$, where it is believed that the final composition reflects about the levels of hafnium impurity normally encountered in commercially available grades of zirconium starting materials.

In some embodiments, the mixed oxide is $Li_{2.3}Ni(II)_{(0.5)}Ni(III)_{(0.5)}Ta(V)_{0.3}O_a$, where a is as defined herein. In some embodiments, the mixed oxide is $Li_{2.3}Ni(II)_{(0.5)}Ni(III)_{(0.5)}Ta(V)_{0.3}O_{3.4}$.

In some embodiments, the mixed oxide is further doped with an additional metal or metal oxide. In some embodiments, the mixed oxide has an optical density in the dark state of at least about 10 $\mu m^{-1}$ at an optical wavelength of about 450 nm. In some embodiments, the mixed oxide has a bleached state optical absorption of less than about 0.5 $\mu m^{-1}$ at an optical wavelength of about 450 nm. In some embodiments, the mixed oxide has a refractive index of at least about 2.0. In some embodiments, the thickness of the counter electrode layer ranges from about 80 nm to about 500 nm. In some embodiments, the thickness ranges from about 100 nm to about 320 nm. In some embodiments, the mixed oxide is substantially amorphous. In some embodiments, the mixed oxide is prepared by reactive sputter deposition. In some embodiments, the mixed oxide is prepared by d.c. magnetron reactive sputter deposition. In some embodiments, the electrochromic device is incorporated into an insulated glazing unit.

Another non-limiting embodiment includes an insulated glazing unit comprising an electrochromic device as described herein and another glass panel separated from the electrochromic device.

Another non-limiting embodiment includes a method for depositing a mixed oxide disclosed herein onto a substrate by means of reactive sputtering deposition, where the substrate may be glass, plastic, a laminate, an electrochromic device, a thin film, or a laminate.

Another non-limiting embodiment includes a method for the preparation of an electrochromic device comprising: (a) providing a first conductive layer, (b) depositing one of an electrochromic layer or a counter electrode layer on the first conductive layer, thereby providing a first deposited electrode, (c) depositing an ion-conductor layer on the first deposited electrode, (d) depositing the other of the electrochromic layer or the counter electrode layer on the ion-conductor layer, thereby providing a second deposited electrode, (e) depositing a second conductive layer on the second deposited electrode, wherein the counter electrode layer comprises a mixed oxide having a formula $Li_xNi(II)_{1-y}Ni(III)_yM_zO_a$, where M is a metal, and x is about 0 to about 10, y is about 0 to about 1, z is about 0 to about 10, and a is from about $(0.5x+1+0.5y+z)$ to about $(0.5x+1+0.5y+3.5z)$. In some embodiments, the method further comprises depositing lithium into one of the ion-conductor layer or the counter electrode layer.

In some embodiments, the mixed oxide has the formula $Li_xNi(II)_{(1-y)}Ni(III)_{(y)}M(A)_zO_{(1+0.5x+0.5y+1.5z)}$, where A is the oxidation state of the metal M. In some embodiments, M(A) is selected from the group consisting of Al(III), Sc(III), Cr(III), Co(III), Y(III), Rh(III), In(III), La(III), Ce(III), Nd(III), and Sm(III). In some embodiments, the mixed oxide has the formula $Li_xNi(II)_{(1-y)}Ni(III)_{(y)}M(A)_zO_{(1+0.5x+0.5y+2z)}$, where A is the oxidation state of the metal M. In some embodiments, M(A) is selected from the group consisting of Si(IV), Ti(IV), Mn(IV), Zr(IV), Sn(IV), Ce(IV), Hf(IV), Re(IV), and Ir(IV). In some embodiments, the mixed oxide has the formula $Li_xNi(II)_{(1-y)}Ni(III)_{(y)}M(A)_zO_{(1+0.5x+0.5y+2.5z)}$, where A is the oxidation state of the metal M. In some embodiments, M(A) is selected from the group consisting of V(V), Nb(V), Sb(V), Ta(V), and Pa(V). In some embodiments, the mixed oxide has the formula $Li_xNi(II)_{(1-y)}Ni(III)_{(y)}M(A)_zO_{(1+0.5x+0.5y+3z)}$, where A is the oxidation state of the metal M. In some embodiments, M(A) is selected from the group consisting of Cr(VI), Se(VI), Mo(VI), Te(VI), and W(VI). In some embodiments, the counter electrode is deposited by d.c. magnetron reactive sputtering.

Another non-limiting embodiment includes an electrochromic device comprising: (a) a first electrode comprising one of an electrochromic layer or a counter electrode layer, (b) a second electrode comprising the other of the electrochromic layer or the counter electrode layer, (c) an ion-conductor layer for conducting ions between the first and second electrodes, (d) a first conductive layer, and (e) a second conductive layer, the first and second electrodes and the ion-conductor layer being sandwiched between the first and second conductive layers, the counter electrode layer comprising at least one mixed oxide having a formula $Li_xNi(II)_{1-y}Ni(III)_yM_zO_a$, where M is a metal, and x is about 0 to about 10, y is about 0 to about 1, z is about 0 to about 10, and a is about 0 to about 10.

In addition to the aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

FIG. 6 compares the soft X-ray absorption spectrum for $Li_{1.81}NiW_{0.21}O_x$ material with other mixed nickel oxides.

FIG. 7d depicts a photograph of the $Li_{2.34}NiZr_{0.28}O_x$ in the bleached and dark states, corresponding to the cyclic voltammogram and optical transmission response in FIG. 7a.

DETAILED DESCRIPTION

Embodiments described herein provide an electrochromic device having a counter electrode, which provides a high transmission in the fully intercalated state and is capable of long-term stability suitable for use as a commercial product.

As used herein, the term "bleached state" means the state of an electrochromic material that is at least partially clear or at least partially non-colored.

As used herein, the term "counter ion" means a mobile, transportable, positively charged ion such as H$^+$ (proton) or Li$^+$ (lithium ion.)

As used herein, the term "electrochromic efficiency" means the optical density change per amount of charge transferred per unit area.

As used herein, the term "intercalation" means the reversible insertion of a molecule, atom or ion into a crystal lattice.

As used herein, the term "lithium" means elemental lithium, its salts, oxides, coordination complexes, and chelates. "Lithium" may also refer to lithium ions.

As used herein, the term "optical density" of the dark or fully colored state means the natural logarithm of the bleached state optical transmission divided by the dark state transmission, at a given wavelength, or over a specified wavelength range.

As used herein, the term "optical density" of the bleached state means the natural logarithm of 100% transmission divided by the bleached state transmission, at a given wavelength, or over a specified wavelength range.

As used herein, the term "specific optical density" of a specified layer means the optical density divided by the thickness of the layer.

As used herein, the term "sputtering" means a physical process whereby atoms in a solid target material are ejected into the rarefied gas plasma phase due to bombardment of the material by energetic ions. "Sputtering" will be discussed with regard to its use in film deposition.

Figure 1:
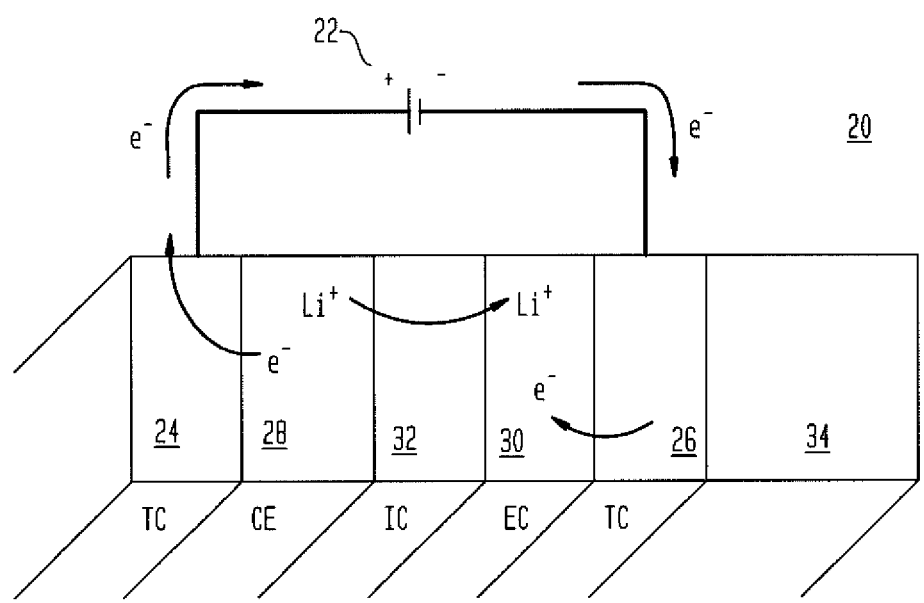
FIG. 1 shows an external circuit driving electrons from a counter electrode (CE) to an electrochromic layer (EC) via the outer transparent conductors (TC).

FIG. 1 shows a five-layer electrochromic device in cross-section. In some embodiments, the device will have at least the following sequential layers: an electrochromic layer ("EC") 30 which produces a change in absorption or reflection upon oxidation or reduction; an ion conductor layer ("IC") 32 which serves as an electrolyte, allowing the passage of ions while blocking electronic current; a counter electrode ("CE") 28 which serves as a storage layer for ions when the device is in the bleached state; and two conductive layers ("CL") 24 and 26 which serve to apply an electrical potential to the electrochromic device. Each of the aforementioned layers is applied sequentially on a substrate 34.

A low voltage electrical source 22 is connected to the device by means of conductive wires. In order to alter the optical properties of window 20, in some embodiments an electrical potential can be applied across the layered structure. The polarity of the electrical source will govern the nature of the electrical potential created and, thus, the direction of ion and electron flow. The electrical potential created will cause ions to flow from the counter electrode layer 28 through the ion conductor layer 32 to the electrochromic layer 30, thereby causing the electrochromic layer 30 to transform to the colored state thereby causing the transparency of the window 20 to be reduced.

The materials employed for the conductive layers 24 and 26 are well known to those skilled in the art. Exemplary conductive layer materials include coatings of indium oxide, indium tin oxide, doped indium oxide, tin oxide, doped tin oxide, zinc oxide, doped zinc oxide, ruthenium oxide, doped ruthenium oxide and the like, as well as all thin metallic coatings that are substantially transparent, such as transition metals including gold, silver, aluminum, nickel alloy, and the like. It is also possible to employ multiple layer coatings, such as those available from Pilkington under the tradename of TEC-Glass®, or those available from PPG Industries under the tradenames SUNGATE® 300 and SUNGATE® 500. The conductive layers 24 and 26 may also be composite conductors prepared by placing highly conductive ceramic and metal wires or conductive layer patterns on one of the faces of the substrate and then overcoating this with transparent conductive materials such as indium tin oxide or doped tin oxides. The conductive layers may be further treated with appropriate anti-reflective or protective oxide or nitride layers.

In some embodiments, the material selected for use in conductive layer 26 is the same as the material selected for use in conductive layer 24. In other embodiments, the material selected for use in conductive layer 26 is different than the material selected for use in conductive layer 24.

In some embodiments, the conductive layers utilized are transparent layers of indium tin oxide. Typically, the conductive layer 26 is disposed on a substrate having suitable optical, electrical, thermal, and mechanical properties such as, for example, glass, plastic or mirror materials, as a coating having a thickness in the range of about 5 nm to about 10,000 nm, and preferably about 10 nm to about 1,000 nm. However, any thickness of the conductive layer may be employed that provides adequate conductance for the electrochromic device and which does not appreciably interfere with the transmission of light where required. Moreover, conductive layer 24 is typically the final layer of the electrochromic device deposited on the counter electrode layer 28. Other passive layers used for improving optical properties, or providing moisture or scratch resistance may be deposited on top of the active layers. These conductive layers are connected to an electrical power source in a conventional manner.

The electrochromic layer 30 ("EC layer" or "EC") may be comprised of materials including inorganic, organic blends and/or composites of inorganic and organic electrochemically active materials such that the EC layer is capable of receiving ions transferred from the CE layer 28. Exemplary inorganic metal oxide electrochemically active materials include $WO_3$, $V_2O_5$, $MoO_3$, $Nb_2O_5$, $TiO_2$, $CuO$, $Ni_2O_3$, $Ir_2O_3$, $Cr_2O_3$, $CO_2O_3$, $Mn_2O_3$, mixed oxides (e.g W—Mo oxide, W—V oxide) and the like. One skilled in the art would recognize that each of the aforementioned metal oxides might be appropriately doped with lithium, sodium, potassium, molybdenum, vanadium, titanium, and/or other suitable metals or compounds containing metals. In a preferred embodiment, the EC layer 30 is selected from $WO_3$ or doped $WO_3$.

The thickness of the EC layer 30 may vary depending on the electrochemically active material chosen. However, the EC layer 30 typically ranges from about 500 Angstroms to about 20,000 Angstroms in thickness, preferably from about 3400 Angstroms to about 5500 Angstroms.

Overlying the electrochromic layer 30 is an ion conductor layer 32. The ion conductor layer 32 is comprised of a solid electrolyte capable of allowing ions to migrate through the layer. The ion conductor layer 32 must have a sufficient ionic transport property to allow ions, preferably lithium ions, to migrate through. Any material may be used for an ion conductor provided it allows for the passage of ions from the counter electrode layer 28 to the electrochromic layer 30. In some embodiments, the ion conductor layer comprises a silicate-based structure. In other embodiments, suitable ion conductors particularly adapted for lithium ion transmission include, but are not limited to, lithium silicate, lithium aluminum silicate, lithium aluminum borate, lithium borate, lithium zirconium silicate, lithium niobate, lithium borosilicate, lithium phosphosilicate, lithium nitride, lithium aluminum fluoride, and other such lithium-based ceramic materials, silicas, or silicon oxides. Other suitable ion-conducting materials can be used, such as silicon dioxide or tantalum oxide, and a wide selection of complex, garnet-like and/or perovskite-like materials based on lithium-lanthanide-transition metal oxides. The overall ion conductor layer may be comprised of multiple component layers of alternating or differing materials, including reaction products between at least one pair of neighboring layers. In some embodiments, the refractive index and thickness of the ion conductor layer are selected to maximize light transmission while minimizing electronic current. In some embodiments, the ion conductive layer 32 has low or no electronic conductivity. In some embodiments, the combination of the ion conductor layer and its material interfaces with the neighboring counter electrode and electrochromic layers serves to, it is believed, effectively block the flow of electronic current over the electrical potential range of electrochromic operation. The preferred ion conductor material is a lithium-silicon-oxide produced by either sputtering or a sol-gel process.

The thickness of the IC layer 32 may vary depending on the material. However, the IC layer 32 typically ranges from about 100 Angstroms to about 700 Angstroms in thickness, preferably from about 200 Angstroms to about 600 Angstroms in thickness, and most preferably from about 325 Angstroms to about 475 Angstroms in thickness.

The counter electrode layer 28 ("CE layer or "CE") is capable of storing lithium and then releasing the lithium for transfer to the electrochromic layer 30 in response to an appropriate electrical potential. In some embodiments, the counter electrode is capable of darkening anodically, allowing the material to be used as a complementary counter electrode for cathodically coloring electrochromic materials such as tungsten oxide.

In some embodiments, the counter electrode layer 28 comprises a material having the general formula $Li_xNi_yM_zO_a$, where M is a metal, and x is about 0 to about 10, y is about 0 to about 1, z is about 0 to about 10, and a is from about $(0.5x+1+0.5y+z)$ to about $(0.5x+1+0.5y+3.5z)$. The metal may be aluminum, scandium, chromium, yttrium, rhodium, indium, lanthanum, cerium, neodymium, samarium, zirconium, silicon, titanium, manganese, tin, hafnium, rhenium, iridium, vanadium, niobium, antimony, tantalum, protactinium, chromium, selenium, molybdenum, tellurium, tungsten, or uranium. Examples of materials according to this formula include $Li_xNi_yTa_zO_a$, $Li_xNi_yNb_zO_a$, $Li_xNi_yZr_zO_a$, and $Li_xNi_yHf_zO_a$, and x is about 0 to about 10, y is about 0 to about 1, z is about 0 to about 10, and a is from about $(0.5x+1+0.5y+z)$ to about $(0.5x+1+0.5y+3.5z)$.

In some embodiments, the CE material is selected such that is meets at least one of the following: (a) an ionic charge or oxidation state greater than or equal to +3; (b) oxide stability or formation energy (Gibbs free energy of formation) of the corresponding oxide greater than or equal to about 500 kJ/mole; (c) electronegativity less than about 1.3 on the Pauling scale; (d) an ionic radius less than or equal to about 130 pm; (e) a band gap energy of a corresponding oxide greater than about 4 eV; (f) negligible optical absorption over about the visible region of the corresponding oxide; (g) an open crystal lattice or oxide structure characterized by a lattice spacing greater than about 0.3 nm; (h) a relative insolubility of nickel oxide into the corresponding oxide up to temperatures of about 900K; (k) a lithium ion conductivity of the corresponding lithium metal oxide of greater than about $1\times10^{-9}$ $Scm^{-2}$.

In some embodiments, the CE material has the general formula $Li_xNi(II)_{(1-y)}Ni(III)_{(y)}M(A)_zO_a$, where M is a metal recited above; A is the most favorable oxidation state of the metal, M; B is 1, 1.5, 2, 2.5, or 3, depending on the oxidation state, A; and each of x and z range from about 0 to about 10, y ranges from about 0 to about 1, and a ranges from about 0 to about 10.

In some embodiments, the CE material has the general formula $Li_xNi(II)_{(1-y)}Ni(III)_{(y)}M(A)_zO_{(1+0.5x+0.5y+Bz)}$, where M is a metal recited above; A is the most favorable oxidation state of the metal, M; B is 1, 1.5, 2, 2.5, or 3, depending on the oxidation state, A; and each of x and z range from 0 to 10, while y can range from 0 to 1. In these embodiments, the sum (1+0.5x+0.5y+Bz) provides, it is believed, an estimate of the oxygen stoichiometry. The exact stoichiometric formula for the materials of the CE layer depend, it is believed, ultimately on the electrochromic state (darkened or bleached) since lithium moves into the material when the material switches from dark to bleached. In general, however, it is believed that the materials may fall into a wide range of sub-stoichiometry through super-stoichiometry for oxygen content. In some embodiments, the range of stoichiometry may vary as much as about 30%. As such, the oxidation state A of metal species M is understood to be the primary oxidation state of metal species, M, where one skilled in the art would appreciate that minor proportions of other oxidation states may be present in the material. This is especially true for thermodynamically metastable materials derived from sputter deposition and other high-energy deposition processes, materials involved in reversible electrochemical processes, and materials of high internal interfacial surface area. In general for the stoichiometric formulae listed above, B=A/2. B denotes the oxygen stoichiometry required to balance, account for, or neutralize the "formal charge" or oxidation state, A, of metal species M, where "formal charge" on one oxygen atom is taken to be −2. For example, when M(A)=Zr(IV), then M=Zr and the oxidation state, or formal charge, A, =+4. Here, two oxygen atoms, with a total formal charge of −4, are required to balance the formal charge, A, =+4.

In some embodiments, x ranges from about 1 to about 4; y ranges from about 0.1 to about 1; and z ranges from about 0.05 to about 2. In other embodiments, x ranges from about 1.5 to about 3; y ranges from about 0.4 to about 0.95; and z ranges from about 0.15 to about 1. In other embodiments, x ranges from about 2 to about 2.5; y ranges from about 0.6 to about 0.9; and z ranges from about 0.2 to about 0.5.

In some embodiments, A is II, III, IV, V, or VI. In other embodiments, A is III, IV, or V. In yet other embodiments, A is IV.

In some embodiments, M is Mg(II), Y(III), La(III), Ce(III), Si(IV), Ti(IV), Zr(IV), Hf(IV), Ir(IV), Nb(V), Ta(V), Mo(VI), or W(VI). In other embodiments, M is La(III), Ce(III), Zr(IV), Hf(IV), Nb(V), or Ta(V). In yet other embodiments, M is Zr(IV) or Hf(IV).

In some embodiments, the CE material has the formula $Li_xNi(II)_{(1-y)}Ni(III)_{(y)}M(A)_zO_{(1+0.5x+0.5y+1.5z)}$, where M is selected from the group consisting of Al(III), Sc(III), Cr(III), Co(III), Y(III), Rh(III), In(III), La(III), Ce(III), Nd(III), and Sm(III).

In some embodiments, the CE material has the formula $Li_xNi(II)_{(1-y)}Ni(III)_{(y)}M(A)_zO_{(1+0.5x+0.5y+2z)}$, where M is selected from the group consisting of Si(IV), Ti(IV), Mn(IV), Zr(IV), Sn(IV), Ce(IV), Hf(IV), Re(IV), and Ir(IV).

In some embodiments, the CE material has the formula $Li_xNi(II)_{(1-y)}Ni(III)_{(y)}M(A)_zO_{(1+0.5x+0.5y+2.5z)}$, where M is selected from the group consisting of V(V), Nb(V), Sb(V), Ta(V), and Pa(V).

In some embodiments, the CE material has the formula $Li_xNi(II)_{(1-y)}Ni(III)_{(y)}M(A)_zO_{(1+0.5x+0.5y+3z)}$, where M is selected from the group consisting of Cr(VI), Se(VI), Mo(VI), Te(VI), and W(VI).

In some embodiments, the material is $Li_{2.3}Ni(II)_{(0.5)}Ni(III)_{(0.5)}Y(III)_{0.3}O_{3.1}$.

In some embodiments, the material is $Li_{2.3}Ni(II)_{(0.5)}Ni(III)_{(0.5)}Zr(IV)_{0.3}O_{3.25}$.

In some embodiments, the material is $Li_{2.3}Ni(II)_{(0.5)}Ni(III)_{(0.5)}Hf(IV)_{0.3}O_{3.25}$.

In some embodiments, the material is $Li_{2.3}Ni(II)_{(0.5)}Ni(III)_{(0.5)}Zr(IV)_{0.294}Hf(IV)_{0.006}O_{3.25}$.

In some embodiments, the material is $Li_{2.3}Ni(II)_{(0.5)}Ni(III)_{(0.5)}Ta(V)_{0.3}O_{3.4}$.

It is believed that the materials of the prior art change in optical density (i.e. an increase in light absorption) over a wavelength range that extends from blue (about 450 nm to about 500 nm) through ultraviolet (less than about 430 nm), rendering transmitted sunlight brown. This modulation in optical density is complementary to tungsten oxide (or any other material comprising the electrochromic layer), which exhibits a reversible change in optical density primarily from red (about 640 nm) through the infrared wavelength range (greater than about 740 nm), rendering transmitted light blue.

As compared with prior art mixed oxides, it is believed that the mixed oxides described herein have an increased light transmission in the blue wavelength region of the spectrum, especially when the mixed oxides used in the CE layer are in the bleached state. As a result, it is believed that these materials may be used to fabricate electrochromic devices that appear closer to "water white" in color, i.e. less yellow than prior art electrochromic devices incorporating prior art CE materials. It is believed that this may be achieved without the aid of additional color balancing filter media (although, filters and other optical enhancement means may still be included in the electrochromic devices, or IGUs comprising the devices).

It is believed that when the mixed oxide CE materials described herein are used in an electrochromic device as a complementary counter electrode, with tungsten oxide used for the working electrode, the combination of blue light absorption through the counter electrode and red light absorption through the tungsten oxide will yield an electrochromic window coating that appears neutral grey when backlit with sunlight, effectively functioning as a variable neutral density filter, with the transmitted light nearly white but at a lower intensity than that of the incident light.

The CE materials described herein, in particular $Li_{2.3}Ni(II)_{0.5}Ni(III)_{0.5}Zr_{0.29}O_{2.73}$, appear to either (1) bleach more completely, and/or (2) bleach more reversibly, than prior art CE materials. As a result, the materials exhibit higher levels of light transmission in the bleached state, after attaining comparable optical density levels for the dark state. Moreover, the bleached state transmission does not appear to degrade with prolonged cycling between dark and bleached states. In fact, it is believed that modifications to the basic crystal structure and electronic state of the nanocrystalline NiO(II) material, resulting from doping by Zr(IV) and Li(I) ions, is believed to be responsible for the improved reversibility.

The specific optical density of the dark state, at an optical wavelength of about 450 nm, of the mixed oxide CE materials disclosed herein, may vary depending on the material chosen. However, the mixed oxide CE materials typically range from about 5 $\mu m^{-1}$ to about 20 $\mu m^{-1}$ in specific optical density, in the dark state at about 450 nm, preferably from about 8 $\mu m^{-1}$ to about 12 $\mu m^{-1}$. In some embodiments, the mixed oxide CE material has a specific optical density in the dark state of about 10 $\mu m^{-1}$ at an optical wavelength of about 450 nm.

The specific optical density of the bleached state, at an optical wavelength of about 450 nm, of the mixed oxide CE materials disclosed herein, may vary depending on the material chosen. However, the mixed oxide CE materials typically range from about 0.1 $\mu m^{-1}$ to about 1 $\mu m^{-1}$ in specific optical density, in the bleached state, preferably from less than about 0.1 $\mu m^{-1}$ to about 0.5 $\mu m^{-1}$. In some embodiments, the mixed oxide CE materials disclosed herein have a specific optical density at about 450 nm for the bleached state of less than about 0.5 μm$^{-1}$ at about 450 nm. In other embodiments, the mixed oxide CE materials disclosed herein have a bleached state optical transmission from about 60% greater than about 99% at about 450 nm (assuming a CE layer thickness of about 200 nm), and in some embodiments from about 75% to 99%.

In some embodiments, the mixed oxide CE materials disclosed herein have a mixed electronic and ionic conductivity from about $10^{-11}$ Scm$^{-1}$ to about $10^{-6}$ Scm$^{-1}$, preferably greater than about $10^{-10}$ Scm$^{-1}$. In some embodiments, the mixed oxide CE materials have a lithium charge capacity of about from about 10 mC/cm$^2$ to about 100 mC/cm$^2$ for a film about 160 nm thick, depending on the chosen composition.

In some embodiments, the mixed oxide CE materials disclosed herein have a refractive index from about 1.7 to about 2.5, depending on the chosen composition, to match the refractive indices of neighboring films of the EC stack.

In some embodiments, when the mixed oxide CE materials are incorporated into an electrochromic device, the electrochromic efficiency of the device can range from about 10 cm$^2$/C to about 80 cm$^2$/C at an optical wavelength of about 450 nm, depending upon the materials chosen for the EC layer 30 and the CE layer 28, and their respective thicknesses.

In some embodiments, the materials selected for the CE layer generally have an optical band gap energy of at least about 3 eV. In other embodiments, the materials selected for the CE layer generally have a band gap energy that can range from about 2.5 eV to about 6 eV, depending on the material chosen.

In some embodiments, at least about 50% of the nickel in the mixed oxide CE materials disclosed herein reside at the surface of the nanocrystals. In some embodiments, the NiO nanocrystals range in size from about 3 nm to about 12 nm. In other embodiments, the NiO nanocrystals range in size from about 4 nm to about 10 nm. In yet other embodiments, the NiO nanocrystals range in size from about 5 nm to about 8 nm.

The thickness of the counter electrode layer 28 is variable depending on the application sought for the electrochromic device and the transmission range desired. As such, the thickness may range from about 80 nm to about 500 nm. In some embodiments, the thickness ranges from about 100 nm to about 320 nm. In other embodiments, the thickness ranges from about 120 nm to about 240 nm. In some embodiments, these ranges may scale inversely with the quotient y/(x+z).

The thickness of the counter electrode comprising the CE materials may also scale with the thickness of the tungsten oxide layer and the desired optical density charge of the complete electrochromic coating. For a y/(x+z) value of 0.2 and a tungsten oxide thickness of about 500 nm, or one preferred counter electrode thickness of 200 nm, the preferred thickness can be expressed as: (2*d*y)/(x+z), where d is the thickness of the tungsten oxide layer in manometers.

For example, (2*500 nm*0.5)/(2.3+0.3)=192 nm. In other words, when the tungsten oxide layer is designed to be about 500 nm thick, to obtain a dark state transmission level of less than about 1.5%, and an optical density change of about 1.6, then the counter electrode layer comprised of the CE material should be about 192 nm thick.

This quantity is believed to be proportional to the concentration of the primary light absorbing species Ni(III). In some embodiments, the value for y/(x+z) is about 0.2. For higher concentrations of Ni(III), the layer may need to be thinner, while for more dilute, smaller concentrations, the layer may need to be thicker, to offer the same modulation in optical density.

In some embodiments, the mixed oxide is present in an amorphous state. In other embodiments, the mixed oxide is present in a crystalline state. In yet other embodiments, the mixed lithium nickel metal oxide may be present in a mixed amorphous and crystalline state. For example, about 50% of the material comprising the mixed oxide may be in an amorphous state. Without wishing to be bound by any particular theory, in some embodiments, the mixed oxides are nano-composites or fine dispersions of nanocrystals in an amorphous matrix. In some embodiments, and again without wishing to be bound by any particular theory, the mixed oxides consist of Ni(II)O nanocrystals imbedded in an amorphous matrix of Li$_2$O, Ni(III)O$_{3/2}$ and M(A)O$_{x/2}$. In embodiments where nanocrystals are present, it is believed that they fall within a narrow size range of between about 3 nm to about 10 nm.

Another embodiment is to provide a method of preparing a counter electrode layer for use in connection with an electrochromic device comprising a mixed oxide as described herein. The mixed oxide CE material may generally be prepared and/or deposited according to the methods described in US2009/0057137, the disclosure of which is hereby incorporated by reference herein in its entirety.

In some embodiments, the CE material described herein is prepared by d.c. magnetron reactive sputter deposition, commonly used to coat window glass with high performance optical coatings. In some embodiments, an electrically conductive ceramic or metallic target is sputtered to eject target material as a stream of atoms, into a low pressure, partial vacuum, partially ionized plasma or glow discharge. The atoms deposit onto a substrate situated several centimeters from the target. The method is known as reactive sputter deposition because the metal atoms react with the sputter gas, usually oxygen, as they travel to the substrate, or in some embodiments once they reach the substrate, to form an oxide.

Essentially, the target consists of a ceramic composite material, or a sintered metal alloy, whose composition is formulated to match the lithium, nickel, and M composition of the counter electrode material in question. Oxygen is fed into the deposition process as a gas, diluted in argon to between about 10% and about 90%. Metal atoms are sputtered off of the sputter target by fast argon and oxygen ions that have been accelerated toward the target surface by an electrical field on the order of several hundred volts. The target atoms sputtered into vacuum react with oxygen on their way to the substrate or at the surface of the growing film. In some cases, intact metal oxide molecules are ejected from the sputter target instead of metal atoms. The pressure in the sputter process vacuum vessel is about 2 to about 20 mTorr. The target itself may be enriched with lithium relative to the desired film composition to compensate for lithium loss to walls of the sputter chamber.

In some embodiments, the mixed oxide CE material is deposited on a buffer layer, the buffer layer (or some other intermediate layer) being situated between the CE layer and the ion conductor layer.

In some embodiments, additional lithium is inserted into the CE material after its deposition onto the ion conductor layer (or buffer or intermediate layer described above). The deposition of the lithium is achieved through one of wet chemical methods, sol-gel, chemical vapor deposition, physical vapor deposition, or reactive sputtering.

Typically the substrate 34 of the electrochromic device is comprised of transparent glass or plastic such as, for example, acrylic, polystyrene, polycarbonate, allyl diglycol carbonate [CR39 available from PPG Industries, Pittsburgh, Pa.], SAN [styrene acrylonitrile copolymer], poly(4-methyl-1-pentene), polyester, polyamide, etc. It is preferable for the transparent substrate 34 to be either clear or tinted soda lime glass, preferably float glass. If plastic is employed, it is preferably abrasion protected and barrier protected using a hard coat of, for example, a silica/silicone anti-abrasion coating, a diamond-like protection coating or their like, such as is well known in the plastic glazing art. Generally, the substrates have a thickness in the range of about 0.01 mm to about 10 mm, and preferably in the range from about 0.1 mm to 5 mm. However, any substrate of any thickness which will provide a functioning electrochromic device may be employed.

It will be appreciated that the counter electrode layer 28 and the electrochromic layer 30 may be reversed in the overall structure of FIG. 1. However, if the CE layer 28 and the EC layer 30 are reversed, the polarity of the applied potential must be adjusted to ensure that the correct polarity for the layers is maintained.

The electrochromic devices described herein could be incorporated into an insulated glazing unit, as known to those of ordinary skill in the art.

The electrochromic device described herein could be coupled with radiation sensors (e.g., visible and solar) and energy management systems to automatically control their transmission and reflection.

The electrochromic device as described herein may be powered with solar cells, thermoelectric sources, wind generators, etc., to make them self-sustaining. These may be also coupled into charge storage devices such as batteries, re-chargeable batteries, capacitors or other means. The charge storage devices could be utilized as automatic backup power source when primary source of power is interrupted.

The electrochromic device may also be used as filters in displays or monitors for reducing the ambient light intensity, e.g., sun glare that is incident on the monitor or display surface. Thus, the device may be employed to enhance the image quality of displays and monitors, particularly in well-lit conditions.

These electrochromic devices may also be used as displays having an advantageously wide viewing area with a high contrast because no polarizers are required as are in conventional liquid crystal displays. The device may also be used as eyewear or sunglasses.

Another exemplary embodiment provides a method of preparing a mixed oxide on a substrate.

Another exemplary embodiment provides a method of preparing an electrochromic device comprising a counter electrode comprised of a mixed oxide as described herein. A first conductive layer 26 is deposited on substrate 34 by methods known in the art and in accordance with the desired properties of a conductor layer as previously mentioned.

An electrochromic layer 30 is then deposited on conductor layer 26 through wet chemical methods, chemical vapor deposition and/or physical vapor deposition (e.g. sol-gel, metallo-organic decomposition, laser ablation, evaporation, e-beam assisted evaporation, sputtering, intermediate frequency reactive sputtering, RF sputtering, magnetic sputtering, DC sputtering, PVD and CVD and the like). In preferred embodiments, the electrochromic layer 30 is deposited via intermediate frequency reactive sputtering or DC sputtering techniques. In one embodiment, the EC layer 30 is deposited on a heated first conductor layer 26.

The deposited electrochromic layer 30 may be comprised of metal oxides including titanium oxides, vanadium oxides, tungsten oxides, molybdenum oxides, or doped variants thereof. In a preferred embodiment, the electrochromic layer 30 deposited is comprised of $WO_3$. In some embodiments, the deposited $WO_3$ may contain a stoichiometric excess or deficiency of oxygen, depending on the deposition method and conditions chosen. In other embodiments, the $WO_3$ may be doped with an appropriate metal or metallic compound.

An ion conductor layer 32 is then deposited on EC layer 30 through wet chemical methods, chemical vapor deposition and/or physical vapor deposition (e.g. sol-gel, metallo-organic decomposition, laser ablation, evaporation, e-beam assisted evaporation, sputtering, intermediate frequency reactive sputtering, RF sputtering, magnetic sputtering, DC sputtering, PVD and CVD and the like). In a preferred embodiment, the ion conductor layer is deposited via a sol gel method or reactive sputtering.

A counter electrode layer 28 comprised of a film of a mixed co-sputter deposited lithium nickel metal oxide is then deposited on the IC layer 32 (or an intermediate buffer layer as described above). The method of depositing this particular layer is disclosed herein.

A second conductive layer 24 is deposited on the lithiated CE layer 28 by methods well known in the art and as described above in the deposition of the first conductive layer 26.

As already mentioned, the position of the counter electrode layer 28 and the electrochromic layer 30 may be reversed in the overall structure presented in FIG. 1. One skilled in the art would appreciate that should the layers be reversed, the method of manufacturing the device does not change with regard to the steps that have to be performed to generate each layer. One skilled in the art would appreciate that the methods utilized above to create a counter electrode comprised of a co-sputter deposited lithium nickel metal oxide material may be used to develop a counter electrode for use in connection with any electrochromic device. That is, the methods used to develop the counter electrode are not limited to use in the specific electrochromic device discussed herein. Moreover, the method of making the counter electrode discussed above may also be used to deposit a counter electrode on any surface, not merely ion conductor layers or other conductive layers.

Non-limiting examples pertaining to CE materials and the preparation of CE materials are recited below. These examples are not intended to limit the scope of the embodiments disclosed herein.

Non-limiting Example of Electrode preparation: Radio frequency (RF) magnetron sputtering was performed on an Angstrom EvoVac deposition system housed in a glove box under an argon atmosphere. Three-inch diameter metal alloy targets, Ni—Zr (80-20 at. %) and Ni—W (80-20 at. %), were purchased from ACI Alloys, while a three-inch diameter ceramic $Li_2O$ target (99.9%) supported on a molybdenum backing plate was purchased from Plasmaterials, Inc. The gun powers for the metal alloy targets and ceramic target were 60 W and 45 W, respectively. The target-substrate distance was 10 cm and remained constant throughout the study, and no additional heating was applied to substrate. The base pressure and total deposition pressure were 10-7 Torr and 2 mTorr, respectively. The $Ar/O_2$ gas mixture was fixed at ½ throughout the study. The fluorine-doped tin oxide (FTO) glass substrates were purchased from Hartford Glass CO, Inc. (TEC 15, 1.5"×0.82"×2.3 mm). The substrates were cleaned successively with soapy water, acetone, isopropanol and deionized water, and dried under flowing nitrogen gas.

Non-limiting Example of a Characterization Method: The crystal structures of the resulting films were characterized on a Philips X-ray diffractometer Model PW1729 operated at 45 kV and 40 mA using CuK alpha radiation. Transmittance and reflectance measurements were performed on a Cary 6000i UV-vis-NIR spectrometer. Field emission scanning electron microscopy (FESEM) was done on a JEOL JSM-7000F Field Emission Scanning Electron Microscope with an EDAX Genesis EDS. X-ray photoelectron spectroscopy (XPS) was performed on a Kratos Axis HSi Ultra X-ray Photoelectron Spectrometer using an Al K$\alpha$ X-ray source operated at 14 kV and 10 mA. Transmission electron microscopy (TEM) was done on a FEI Technai G2 F20 TEM.

Non-limiting Example of Electrochromic Measurement: The measurement techniques were reported previously. Briefly, electrochromic properties were measured in a liquid electrolyte half-cell where the electrolyte was 1 M lithium perchlorate (LiClO4) dissolved in propylene carbonate (PC). Cyclic voltammetry (CV) was carried out using a BioLogic VMP3 multichannel potentiostat with a scan rate of 20 mV/s and a voltage range of 1.7-4.2 V vs. Li/Li$^+$. In-situ transmittance was measured using a diode laser at 670 nm. Switching kinetics (i.e., coloration and bleaching) were measured under potential step cycling from 1.7 to 4.2 V vs. Li/Li+, where each potential step was maintained for 2 min. The switching speed is defined as the time required achieving about 90% of total transmittance change within a potential step. All electrochemical measurements were carried out under an argon atmosphere in a glove box. The samples were transferred from the sputtering chamber to testing cells without exposure to air or moisture.

EXAMPLE 1

Figure 2A:
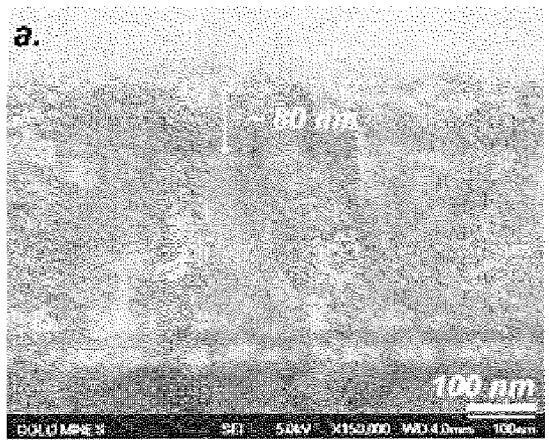
FIGS. 2a-2c illustrate the structure of a counterelectrode layer.

Structural characterization results for the as-deposited $Li_{2.34}NiZr_{0.28}O_x$ films prepared by RF magnetron sputtering are shown in FIG. 2. Cross-sectional scanning electron microscopy (SEM) image (FIG. 2a) shows the film thickness is ca. 80 nm, which is thinner than reported nickel oxide-based anodic electrodes.

Figure 2B:
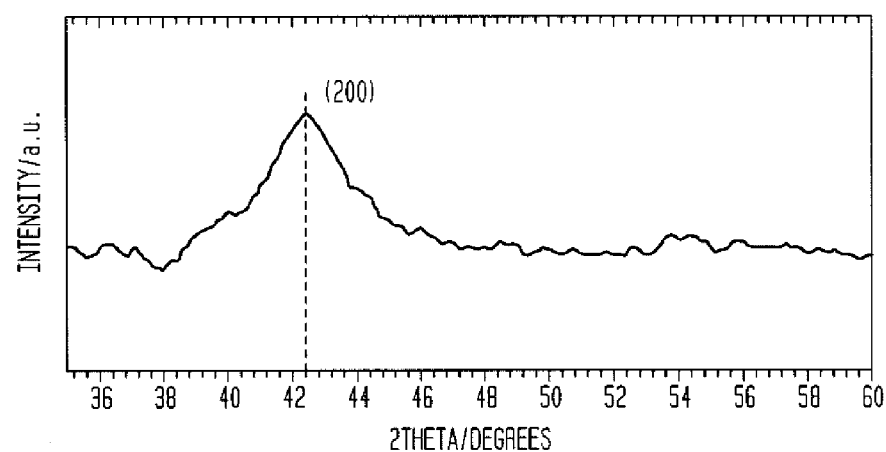

FIG. 2b provides the X-ray diffraction (XRD) spectrum for the as-deposited $Li_{2.34}NiZr_{0.28}O_x$ film. Only the (200) peak is observed in the spectrum indicating that nickel oxide nanocrytallites were preferentially oriented along the <100> direction. Additionally, the diffraction angle (2$\theta$=42.5°) was shifted towards a lower value relative to the face center cubic NiO indicating that the lattice constant of the nickel oxide-based material is expanded due to the doping of Zr and Li in the lattice.

Figure 2C:
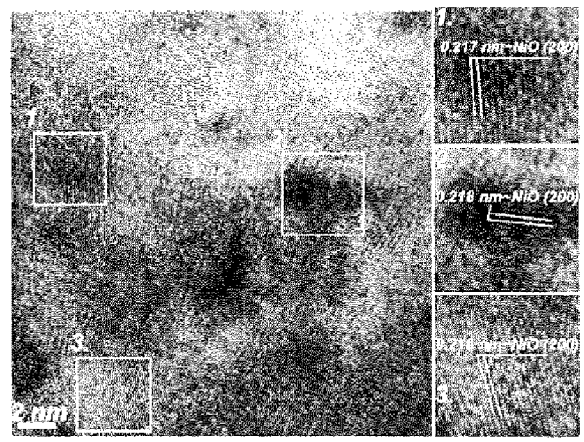

High-resolution transmission electron microscopy (HR-TEM) image is shown in FIG. 2c. Nickel oxide nanocrytallites were believed to be imbedded in an amorphous matrix, which is similar to the morphology observed in $Li_{1.81}NiW_{0.21}O_x$ and porous $WO_3$ thin films. An amorphous matrix has been shown to provide fast Li+ diffusion channels in nickel oxide-based anodic electrode materials. Importantly, the lattice distances of about 0.216 nm, about 0.217 nm and about 0.218 nm were slightly larger than the standard d200 of cubic NiO, which is consistent with the shift observed in the XRD spectrum. Inductively coupled plasma mass spectroscopy (ICP-MS) analysis confirms that the molar ratio between Li and Ni was about 2.3 ($Li_{2.34}NiZr_{0.28}O_x$).

EXAMPLE 2

Figure 3:
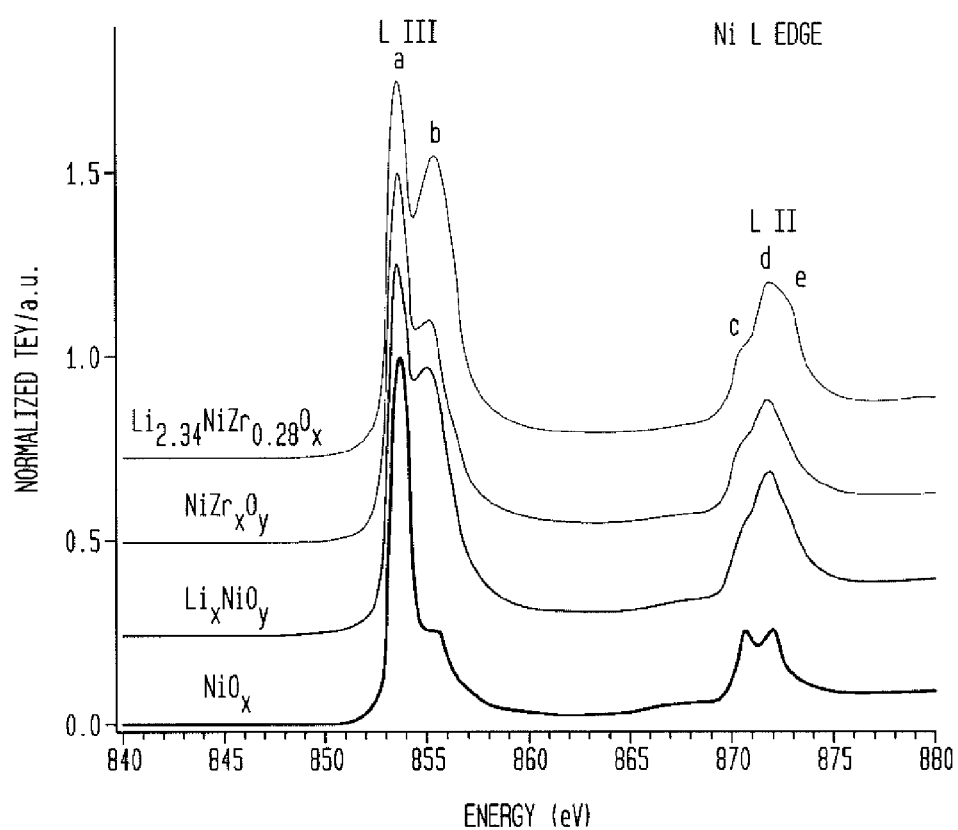
FIG. 3 illustrates the soft X-ray absorption spectrum for various mixed nickel oxide materials.

X-ray absorption spectroscopy (XAS) was employed to investigate the Li and Zr co-doping effects on the electronic structure of nickel oxide. FIG. 3 presents a comparison of the Ni L-edge XAS for several nickel oxide-based thin films, corresponding to dipole transitions from Ni 2p to Ni 3d states, including both the $2p_{3/2}$ (LIII) and $2p_{1/2}$ (LII) spin-orbit final states. Due to the direct dipole transition from 2p to 3d orbitals and the high resolution in the soft x-ray regime, L-edge XAS of transition metals is sensitive not only to the valency of the metal, but also to the detailed energetics of the ligand-3d interactions governed in particular by symmetry, as well as spin and hybridization.

Figure 4:
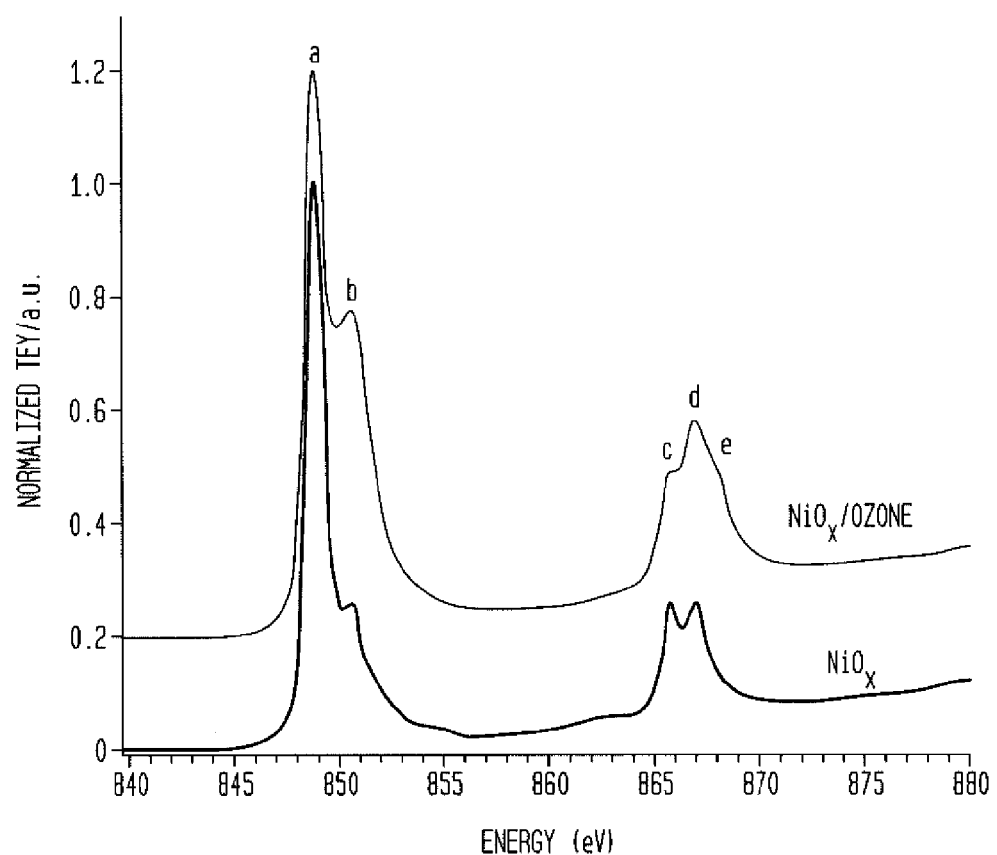
FIG. 4 illustrates the result of treating nickel oxide materials with ozone.
Figure 5A:
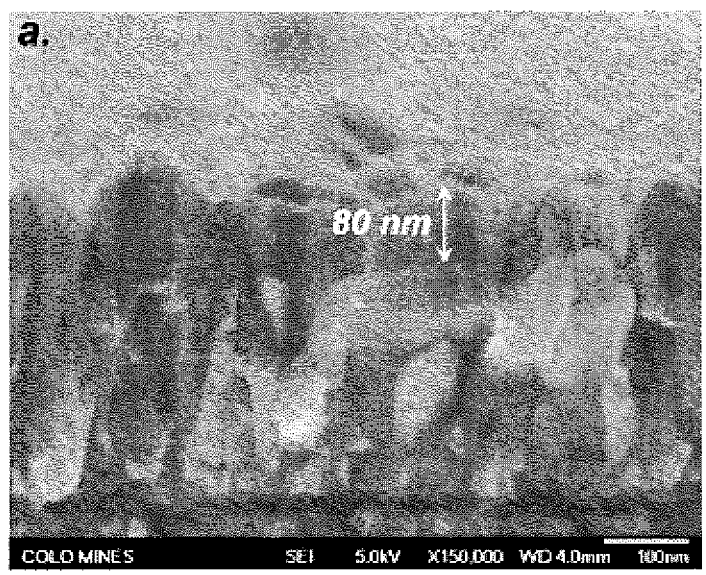
FIG. 5a is a scanning electron micrograph of a fracture edge of a $Li_{1.81}NiW_{0.21}O_x$ material.
Figure 5B:
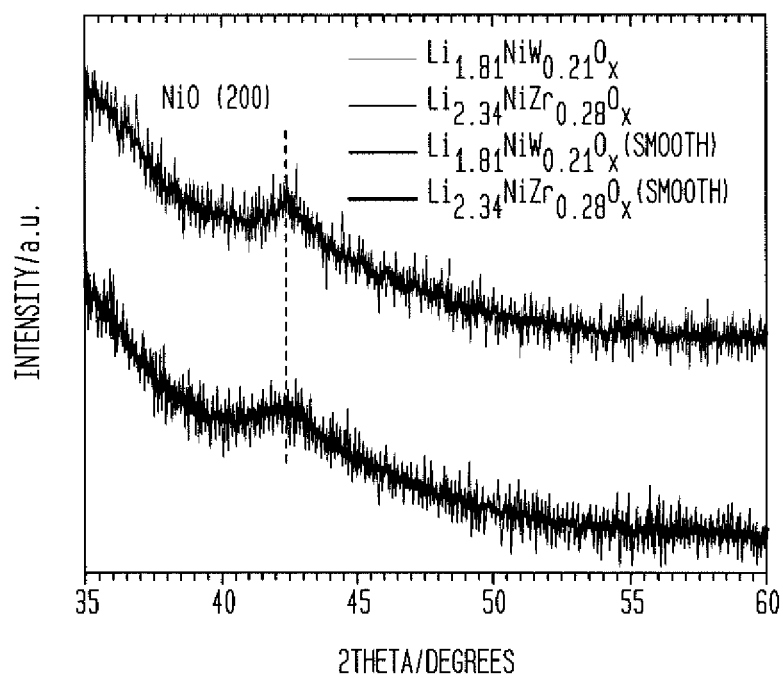
FIG. 5b illustrates the x-ray diffraction pattern for a $Li_{1.81}NiW_{0.21}O_x$ material.

Although rigorous treatment of all possible final states can be complicated, the most salient features of the transition metal L-edge can be captured by atomic calculations by the introduction of crystal field effects. It is believed that the XAS spectrum for a $NiO_x$ film produced by RF magnetron sputtering closely resembled previously reported data for nickel oxide films. Here, the $NiO_x$ XAS spectrum represented transitions from Ni ($2p^63d^8$) to Ni ($2p^53d^9$), where the final state as probed by XAS was well described by atomic multiplet calculations for a single $Ni^{2+}$ in an octahedral coordination (FIG. 3). Upon Li and Zr doping, the high-energy feature b (and e for the LIII edge) was significantly enhanced. This was consistent with a formal increase in the oxidation state of nickel. A similar enhancement in the intensities of features b and e was observed for a $NiO_x$ film after ozone exposure (FIG. 4). Ozone treatment of as-deposited nickel oxide films was previously found to increase the amount of higher oxidation state nickel species. It has been shown, however, that the spectral observations cannot simply be ascribed by a linear combination of $Ni^{2+}$ and $Ni^{3+}$ in an octahedral environment, since the increased hole states upon doping is mainly localized on the oxygen orbitals of the $NiO_6$ unit. Thus, it has been concluded that Li and Zr have been successfully doped into the nickel oxide lattice and modified its electronic structure. A nickel oxide-based electrode containing Li/W additives was prepared utilizing identical sputter deposition conditions as used for $Li_{2.34}NiZr_{0.28}O_x$. A chemical formula of $Li_{1.81}NiW_{0.21}O_x$ was determined by ICP-MS. The film thickness and crystal structure of the $Li_{1.81}NiW_{0.21}O_x$ film were identical to the $Li_{2.34}NiZr_{0.28}O_x$ film (FIG. 5). The XAS spectrum for $Li_{1.81}NiW_{0.21}O_x$ demonstrated a similar co-doping effect as observed in $Li_{2.34}NiZr_{0.28}O_x$ (FIG. 6).

EXAMPLE 3

$$\text{Specific optical density} = \ln(\%T_b/\%T_c)/\text{thickness} \qquad \text{Eq. (1)}$$

Figure 7A:
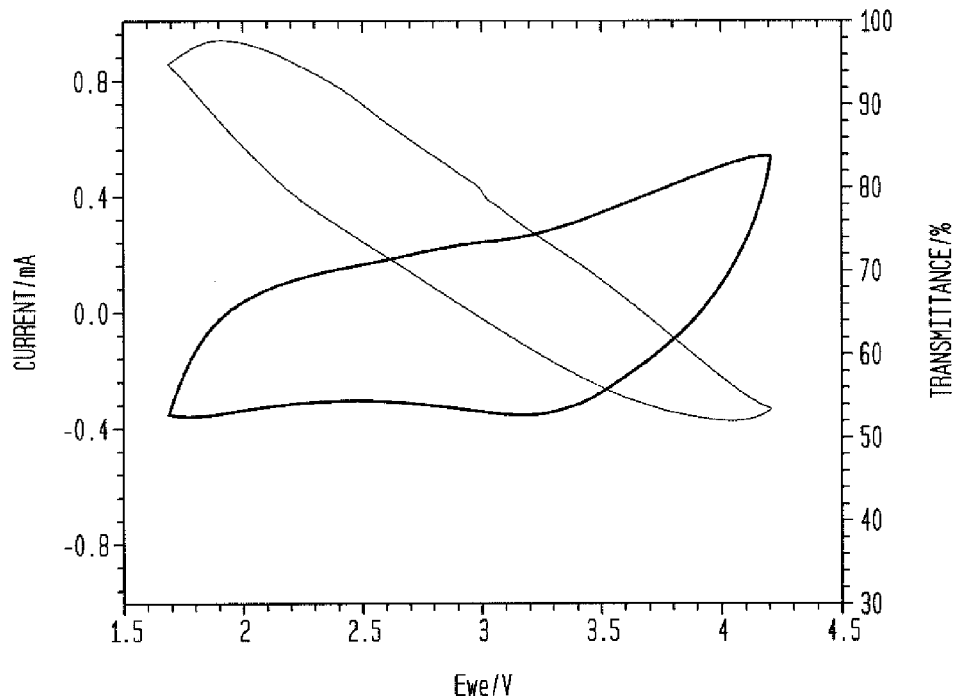
FIG. 7a compares cyclic voltammograms and corresponding 670 nm light transmission signals for 80 nm thick, 1 cm$^2$ samples of $Li_{2.34}NiZr_{0.28}O_x$.
Figure 7B:
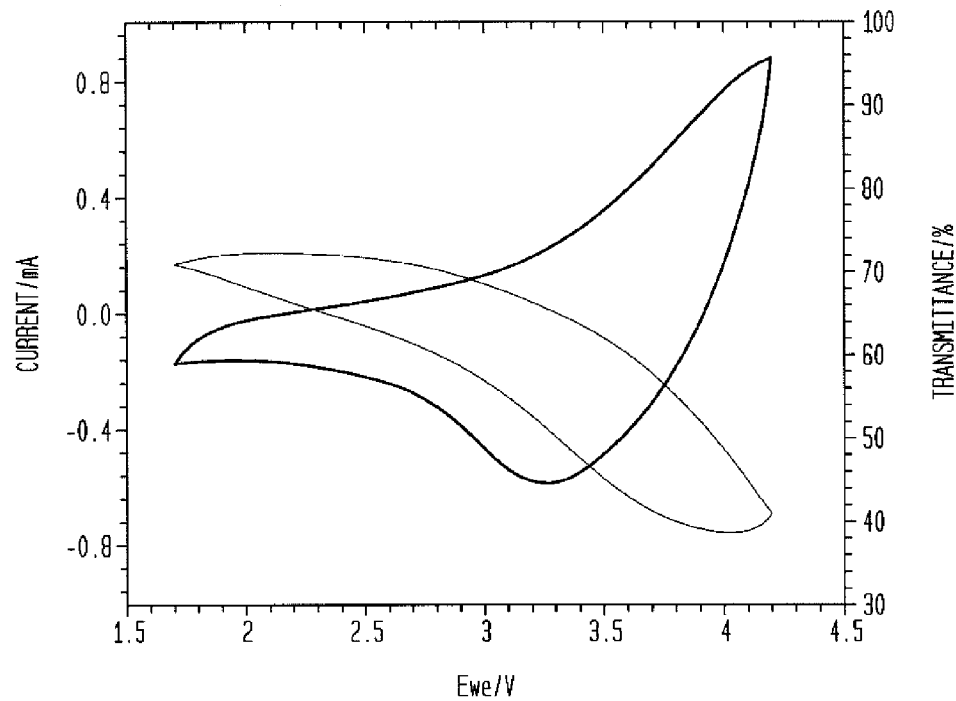
FIG. 7b compares cyclic voltammograms and corresponding 670 nm light transmission signals for 80 nm thick, 1 cm$^2$ samples of $Li_{1.81}NiW_{0.21}O_x$.
Figure 8:
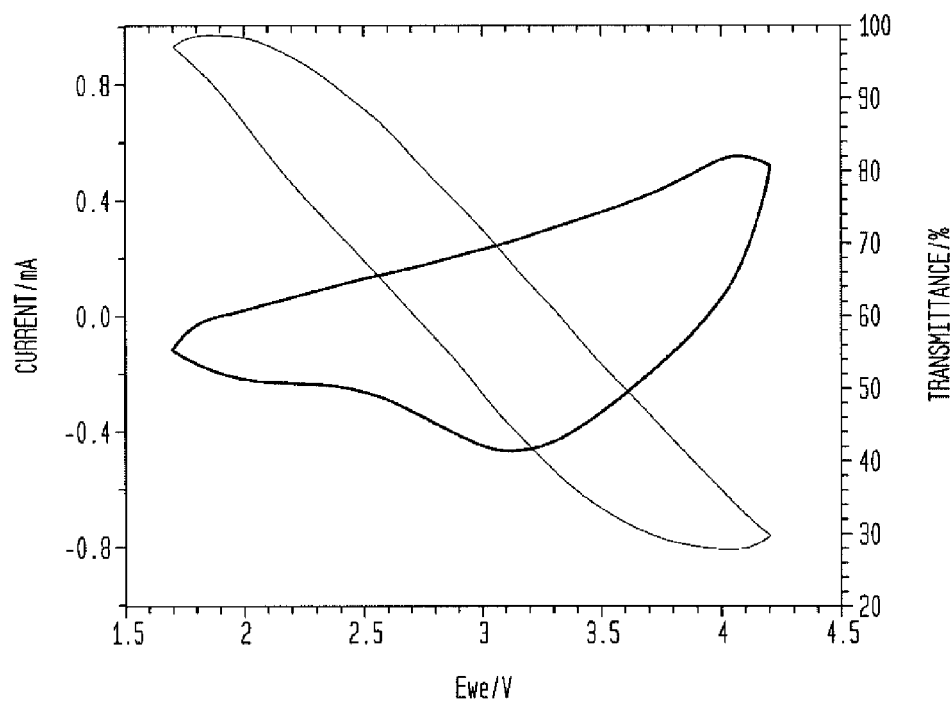
FIG. 8 shows the cyclic voltammogram and corresponding 670 nm light transmission through a $Li_{2.34}NiZr_{0.28}O_x$ material.

Cyclic voltammetry and in-situ transmittance curves for $Li_{2.34}NiZr_{0.28}O_x$ and $Li_{1.81}NiW_{0.21}O_x$ thin film electrodes cycled in a 1 M $LiClO_4$ dissolved in propylene carbonate are shown in FIGS. 7a and 7b. The charge capacities (determined from the CVs) are 21.8 mC/cm$^2$ and 21.4 mC/cm$^2$ for the $Li_{2.34}NiZr_{0.28}O_x$ and $Li_{1.81}NiW_{0.21}O_x$ electrodes, respectively. The charge capacities for $Li_{2.34}NiZr_{0.28}O_x$ and $Li_{1.81}NiW_{0.21}O_x$, it is believed, could be controlled (modified) easily by varying the film thickness. The in-situ optical modulation at about 670 nm for the $Li_{2.34}NiZr_{0.28}O_x$ film was about 45% compared to about 35% for the $Li_{1.81}NiW_{0.21}O_x$ film. As determined by Eq. (1), the high specific optical density (defined as the optical density per micrometer) for the $Li_{2.34}NiZr_{0.28}O_x$ film (8.1 $\mu m^{-1}$) was comparable to that of the state-of-the-art porous $WO_3$ film (9.0 μm$^{-1}$). Without wishing to be bound by any particular theory, it is believed that a high specific optical density enables a reduction in film thickness without compromising optical contrast properties, therefore reducing manufacturing costs. It should be noted that a thicker $Li_{2.34}NiZr_{0.28}O_x$ film (about 200 nm) showed significantly improved optical modulation (about 72% at 670 nm) while maintaining an optimal bleached state transparency (FIG. 8).

Figure 7D:
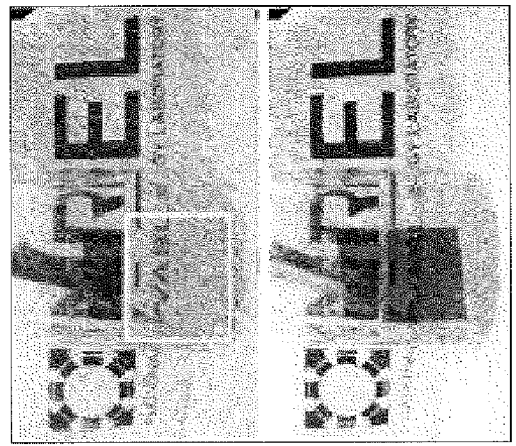
Figure 7C:
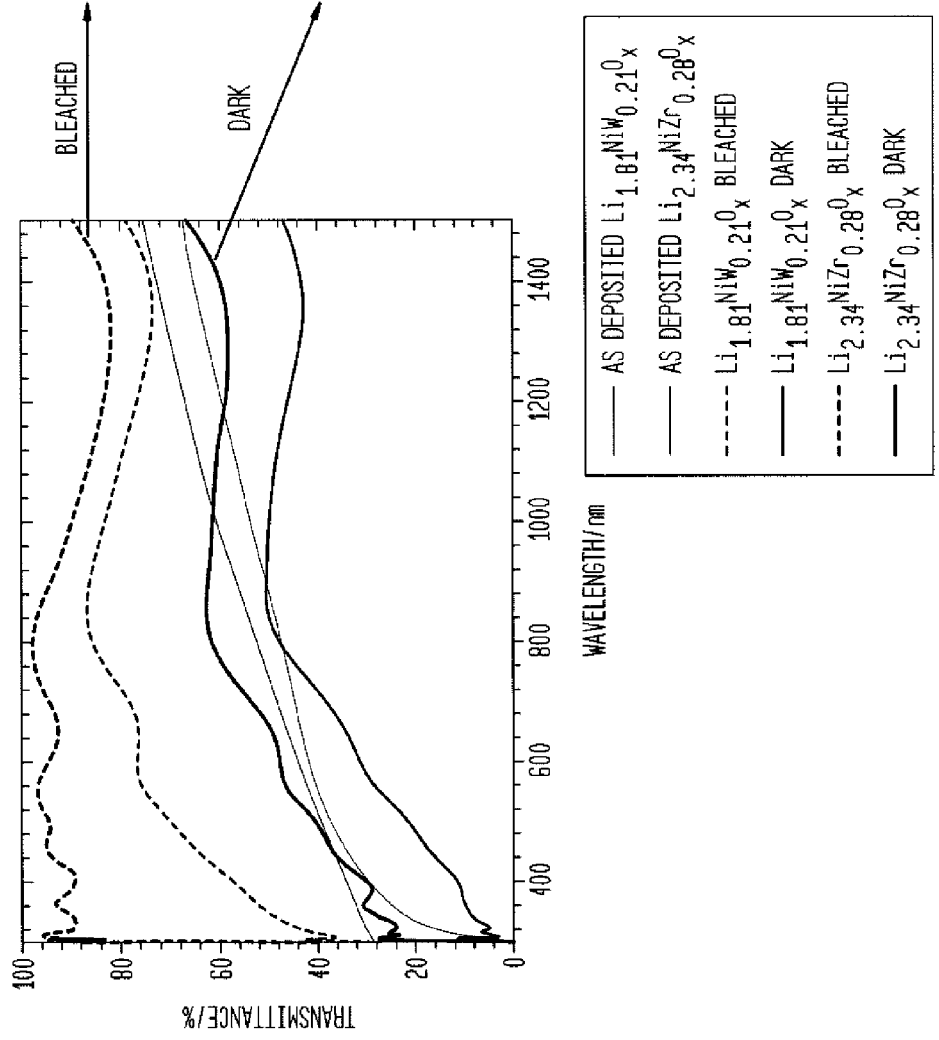
FIG. 7c depicts the optical spectra for the as deposited, bleached and dark states corresponding to the cyclic voltammograms in FIGS. 7a and b.

The coloration efficiencies of $Li_{2.34}NiZr_{0.28}O_x$ and $Li_{1.81}NiW_{0.21}O_x$ at 670 nm are ca. 33 cm$^2$/C and ca. 31 cm$^2$/C, respectively. Importantly, the bleached state of $Li_{2.34}NiZr_{0.28}O_x$ film was more transparent than that of $Li_{1.81}NiW_{0.21}O_x$ film. FIG. 7c provides the UV-vis-NIR spectra (300-1500 nm) for the as-deposited, bleached and dark films. Overall, the as-deposited films showed similar optical characteristics except that the $Li_{2.34}NiZr_{0.28}O_x$ film had higher transmittance especially for irradiation wavelengths less than about 400 nm. Due to band gap and d-d transition absorptions, the transmittance of nickel oxide films typically decreased when the irradiation wavelength was less than 800 nm. However, the decrease did not occur in the bleached state of the $Li_{2.34}NiZr_{0.28}O_x$ film. A significantly larger contrast in the bleached-state transparency was observed for the $Li_{2.34}NiZr_{0.28}O_x$ film in the UV-vis region relative to the $Li_{1.81}NiW_{0.21}O_x$ film.

A relative determination of perceived light intensity with respect to the human eye is necessary when a high level of transparency and near colorlessness is desired in the bleach-state of an electrochromic device. Therefore, utilizing the UV-vis-NIR data in FIG. 7c, the CIE-defined L*a*b* color coordinates were calculated as detailed in the experimental methods, where the three coordinates, L*a*b*, represented the lightness of the color (L*), its position between red/magenta and green (a*, negative values indicate green and positive values indicate magenta) and its position between yellow and blue (b*, negative values indicate blue and positive values indicate yellow). The b* values for the bleached states of $Li_{2.34}NiZr_{0.28}O_x$ and $Li_{1.81}NiW_{0.21}O_x$ were estimated to be about 6.5 and about 12.6, respectively. A b* value below 8 was typically undetectable by the human eye indicating that the bleached-state for $Li_{2.34}NiZr_{0.28}O_x$ was nearly colorless (no remnant yellow color, FIG. 7d). Furthermore, the bleached-state transmittance of $Li_{2.34}NiZr_{0.28}O_x$ was highly improved in the near infrared region. This improved transparency across the spectrum allowed for more efficient control of solar heat gain and natural light harnessing.

EXAMPLES 4

Figure 9A:
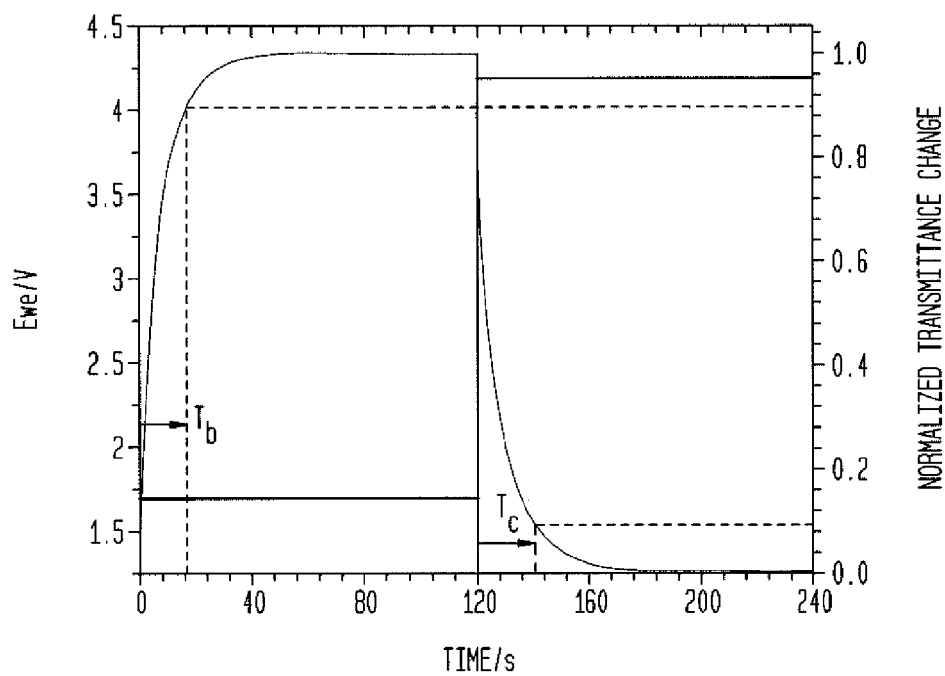
FIGS. 9a and 9b depict the change in optical transmission for 670 nm light, for bleaching from the fully dark state.
Figure 9B:
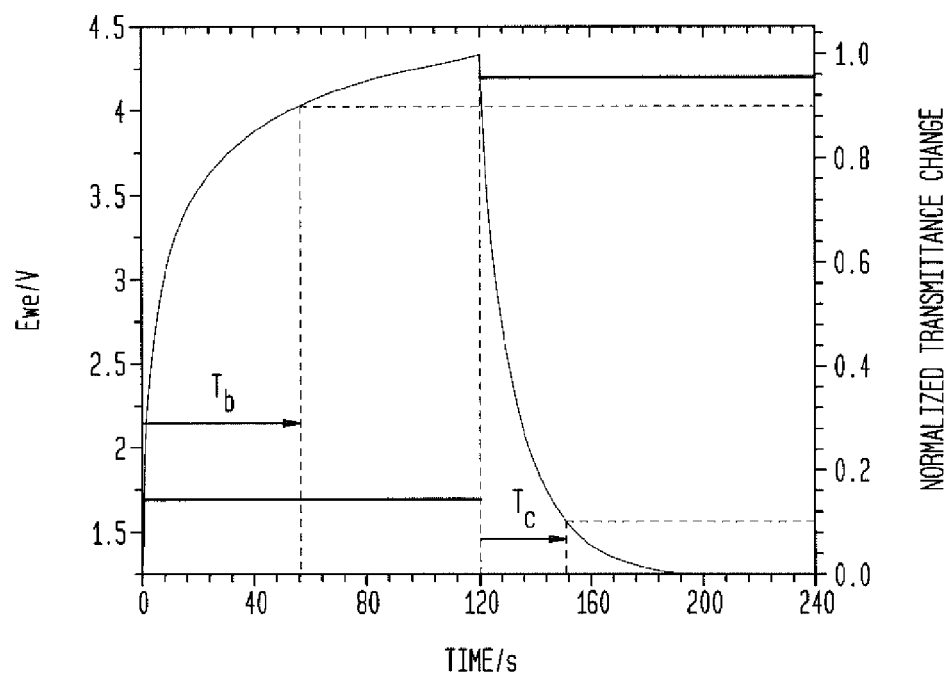
Figure 10A:
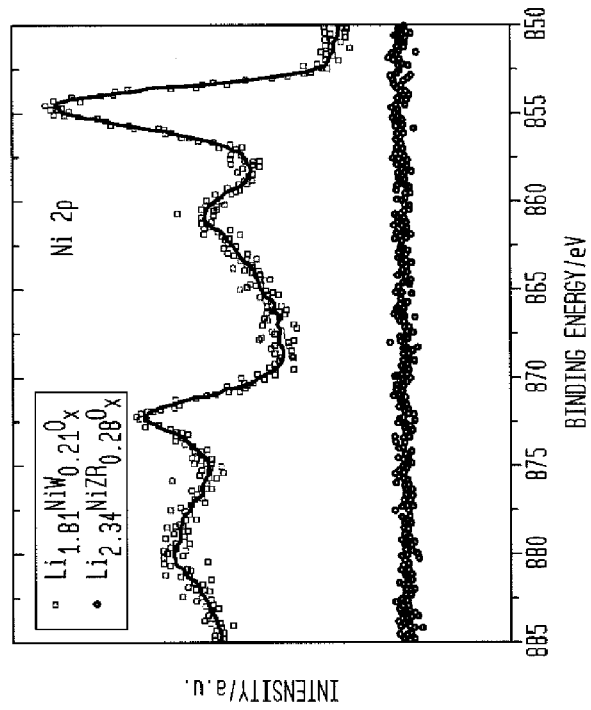
FIGS. 10a-10f depict X-ray Photoelectron Spectra (XPS) for $Li_{2.34}NiZr_{0.28}O_x$ and $Li_{1.81}NiW_{0.21}O_x$ materials.
Figure 10B:
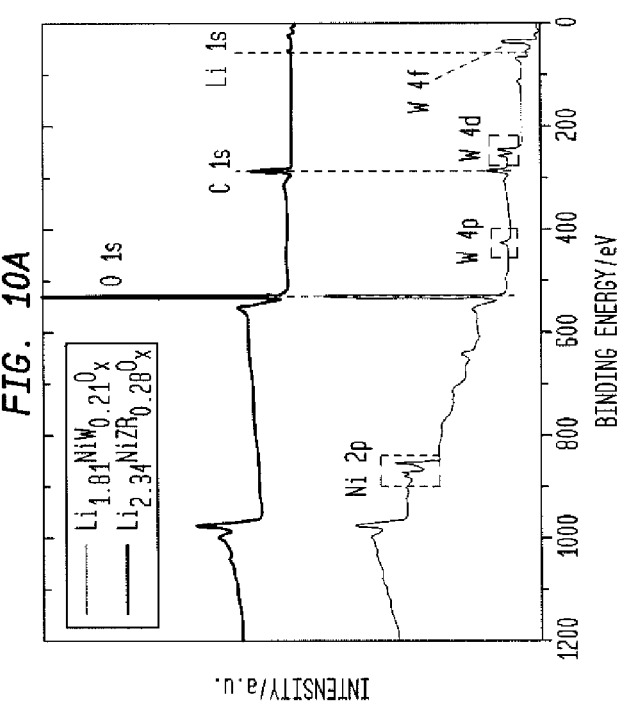
Figure 10C:
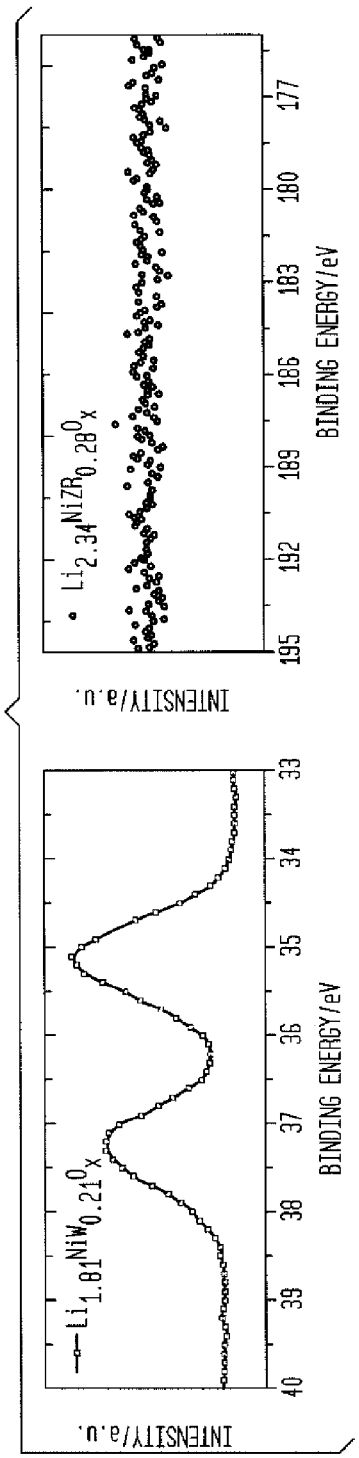
Figure 10E:
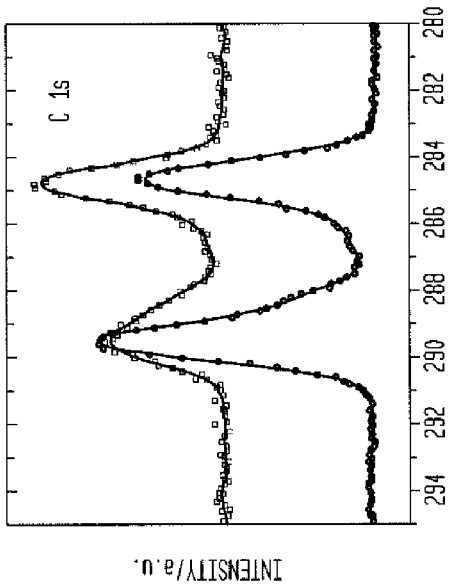
Figure 10D:
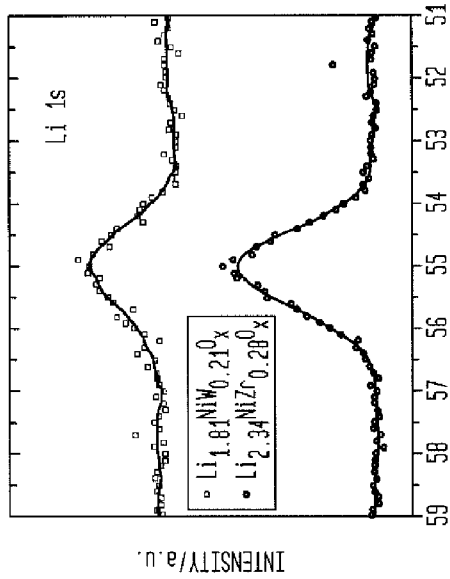
Figure 10F:
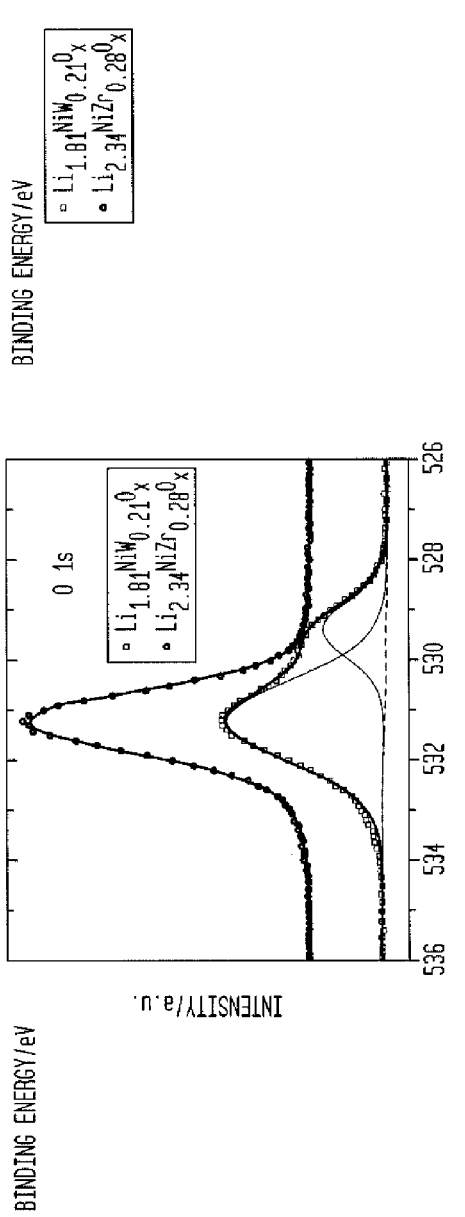

Electrochromic processes in nickel oxide anodic electrodes are typically slower than in cathodic $WO_x$ electrodes and, it is believed, impede the overall switching kinetics of a layered electrochromic device. Wet-chemical synthesis routes have been employed to fabricate porous nickel oxide structures in order to reduce the switching time from one state to another state. Improved optical switching (insertion and removal of lithium) has also been observed in modified nickel oxide films synthesized using conventional sputter techniques. The normalized in-situ transmittance changes under potential step cycling are shown in FIGS. 9a and 9b, for $Li_{2.34}NiZr_{0.28}O_x$ and $Li_{1.81}NiW_{0.21}O_x$, respectively. The switching speed was defined as the time required to achieve about 90% of transmittance change upon a potential step. In Li-ion electrolyte, the bleaching and coloration kinetics were both greatly improved for the $Li_{2.34}NiZr_{0.28}O_x$ film, with bleaching ($T_b$) and coloration ($T_c$) times of about 18 seconds and about 20 seconds, respectively. The $T_b$ and $T_c$ times for $Li_{1.81}NiW_{0.21}O_x$ were 61 seconds and 31 seconds, respectively.

EXAMPLE 5

Figure 11A:
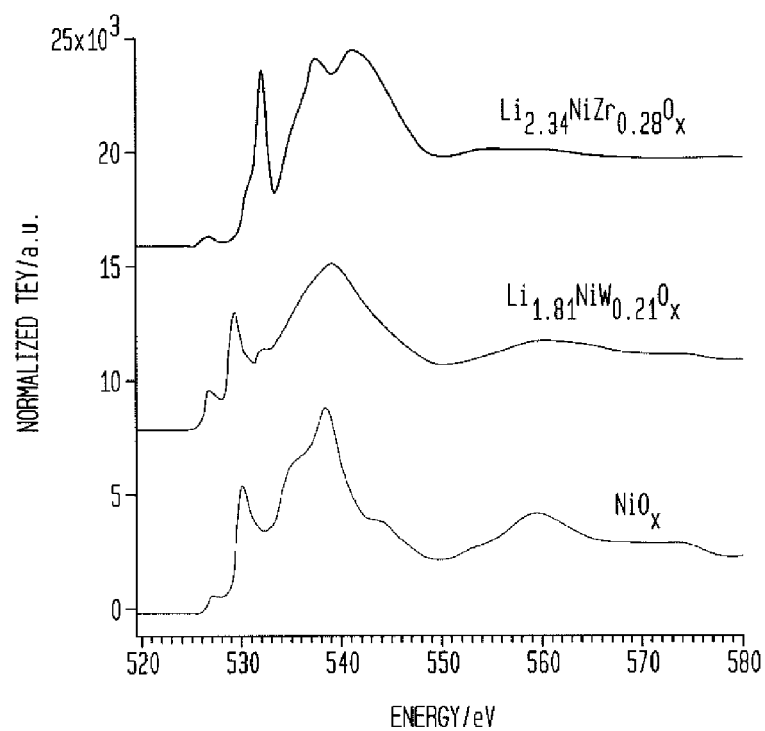
FIG. 11a provides a soft X-ray spectrum for $Li_{2.34}NiZr_{0.28}O_x$ material.
Figure 11B:
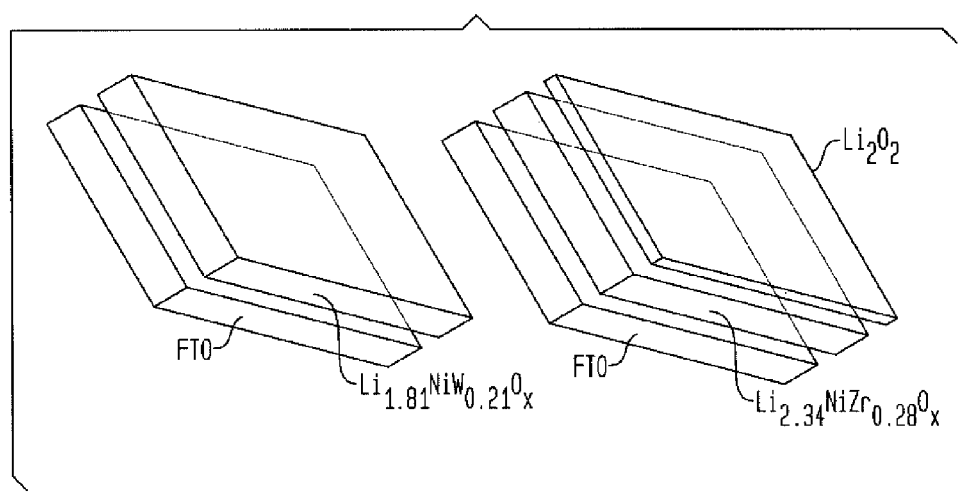
FIG. 11b depicts a structure for surface lithium peroxide formation on a layer of $Li_{2.34}NiZr_{0.28}O_x$.

The interface between an electrochromic film and electrolyte plays a crucial role in facilitating the efficient insertion and removal of lithium. The surface composition of the nickel oxide-based electrodes was probed with X-ray photoelectron spectroscopy (XPS) and O K-edge XAS. As shown in FIG. 10, the XPS spectra for $Li_{2.34}NiZr_{0.28}O_x$ and $Li_{1.81}NiW_{0.21}O_x$ clearly demonstrated that the surface composition of the modified nickel-oxide films depended on the metal additives (Li/Zr vs. Li/W). High-resolution XPS identified every element (i.e., Li, Ni, W and O) present in the $Li_{1.81}NiW_{0.21}O_x$ film. However, only Li and O were observed for the $Li_{2.34}NiZr_{0.28}O_x$ film. This observation suggested that phase separation occurred during the deposition of the $Li_{2.34}NiZr_{0.28}O_x$ film and a lithium rich layer ($Li_2O$ and/or $Li_2O_2$) was generated on the surface of the film. O K-edge XAS spectra could, it is believed, directly reflect structural information about electronic structure of O ions in the lithium rich surface layer. FIG. 11a shows O K-edge XAS spectra for $NiO_x$, $Li_{2.34}NiZr_{0.28}O_x$ and $Li_{1.81}NiW_{0.21}O_x$ materials. The pre-edge feature at ca. 527 eV was believed to be attributed to the transition of O 1s state to the unoccupied states (i.e., hole state) with p characteristics as a result of high oxidizing environment during material synthesis. A strong peak was found at ca. 533 eV for the $Li_{2.34}NiZr_{0.28}O_x$ sample, which was believed to be a signature for lithium peroxide (i.e., $Li_2O_2$). This signature peak for lithium peroxide was reduced for the $Li_{1.81}NiW_{0.21}O_x$ film and was consistent with the XPS data where a lithium rich surface layer was not observed for $Li_{1.81}NiW_{0.21}O_x$. Based on the discussion above, FIG. 11b was the proposed schematic representation of $Li_{2.34}NiZr_{0.28}O_x$ and $Li_{1.81}NiW_{0.21}O_x$. To the best of our knowledge, this is the first time that $Li_2O_2$ has been integrated with an electrochromic electrode. It is believed that the formation of a surface $Li_2O_2$ layer facilitates the efficient diffusion of $Li^+$ and accounts for the superior switching kinetics observed in $Li_{2.34}NiZr_{0.28}O_x$ relative to $Li_{1.81}NiW_{0.21}O_x$.

EXAMPLE 6

Figure 12B:
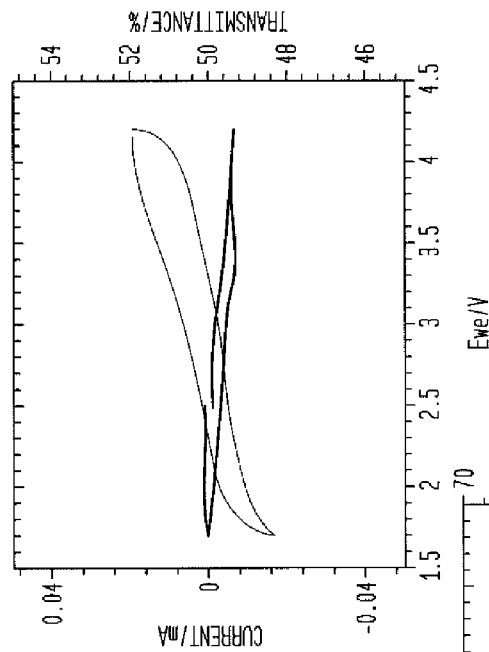
FIGS. 12a-12c depict cyclic voltammograms and corresponding transmission signals for 670 nm light for $NiZr_xO_y$ materials.
Figure 12A:
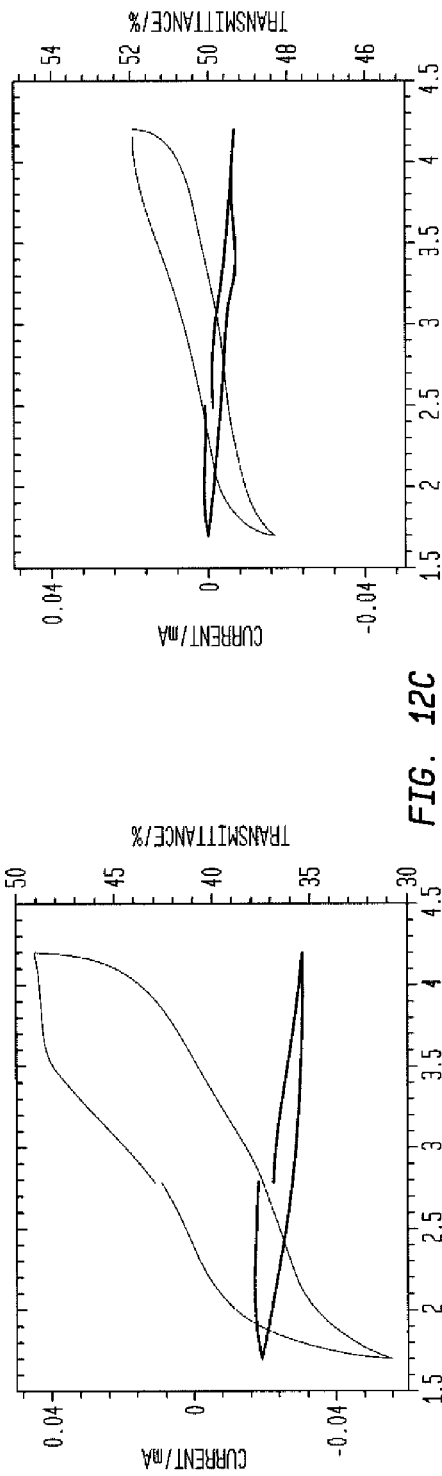
Figure 12C:
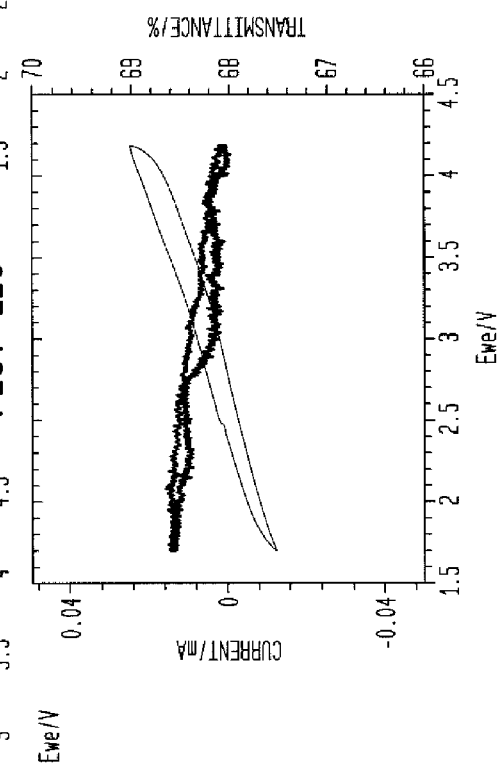
Figure 13A:
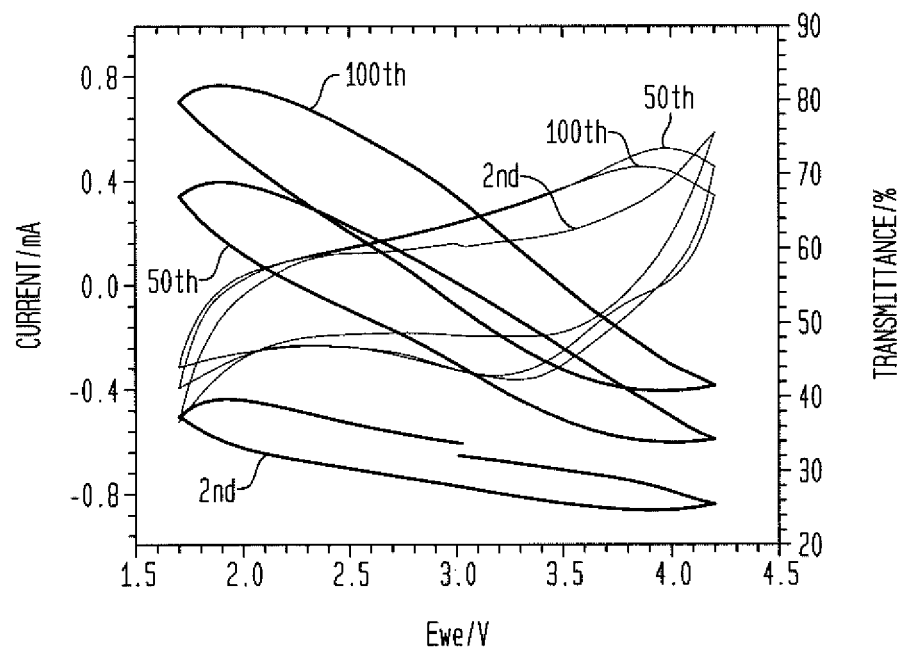
FIGS. 13a and 13b depict electrochromic switching results for $Li_xNiO_x$ materials.
Figure 13B:
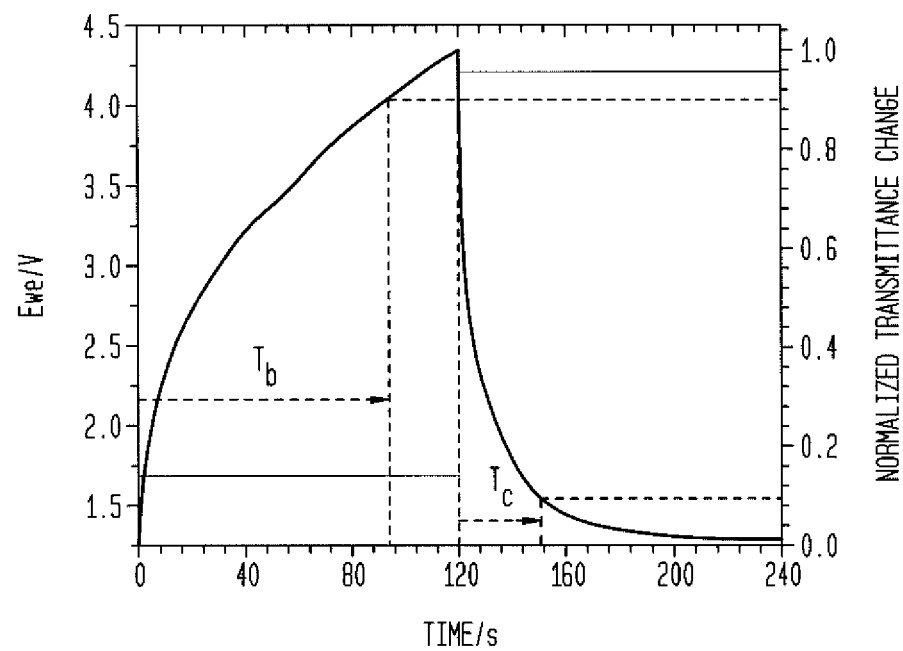

The highly improved electrochromic performance in the $Li_{2.34}NiZr_{0.28}O_x$ electrode is also associated with the uniqueness of the composition of the multicomponent films. FIGS. 12 and 13 compare the in-situ optical modulation and switching kinetics of $NiZr_xO_y$ and $Li_xNiO_y$. In general, without in-situ lithiation, the optical modulation for $NiZr_xO_y$ would be exceedingly reduced and the bleached-state transparency would be significantly improved when Zr is present, presumable in the form of $ZrO_2$. These additional nickel oxide-based films showed that the improved depth of coloration and switching kinetics were strongly reliant on the presence of $ZrO_2$ and a lithium rich matrix ($Li_2O$ and $Li_2O_2$) in $Li_{2.34}NiZr_{0.28}O_x$.

EXAMPLE 7

Figure 14A:
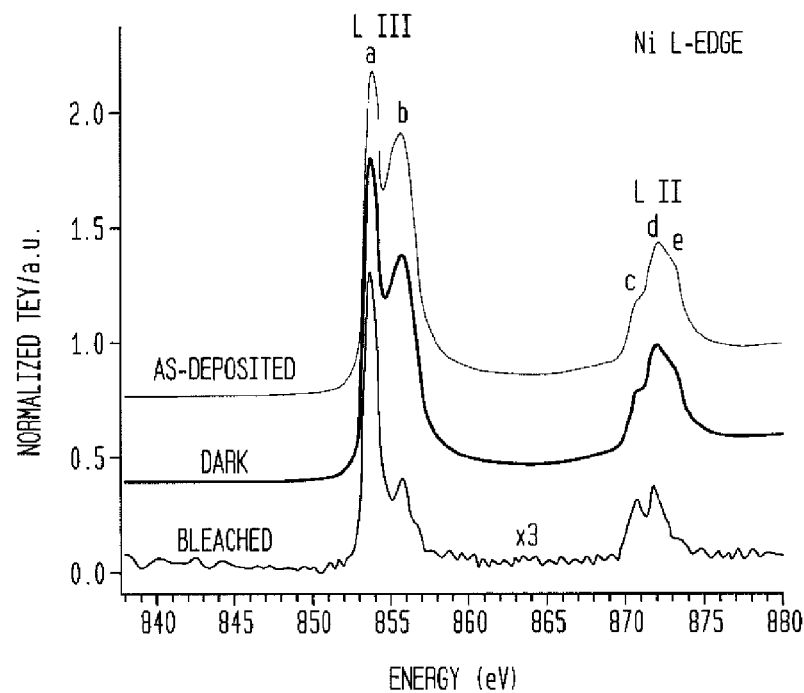
FIGS. 14a and 14b illustrate X-ray absorption spectra for $Li_{2.34}NiZr_{0.28}O_x$ materials.
Figure 14B:
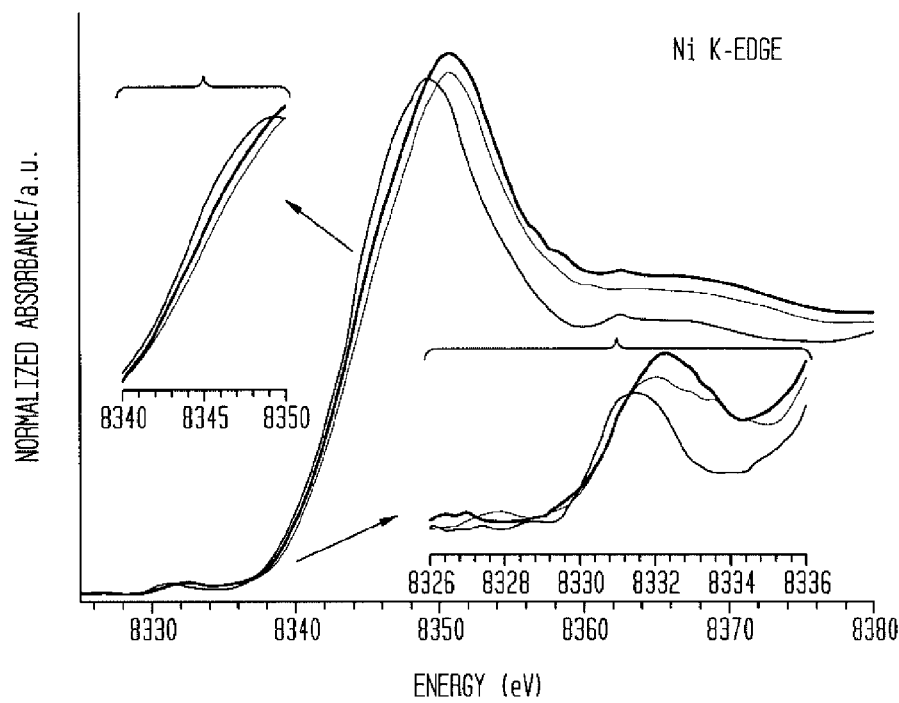
Figure 15A:
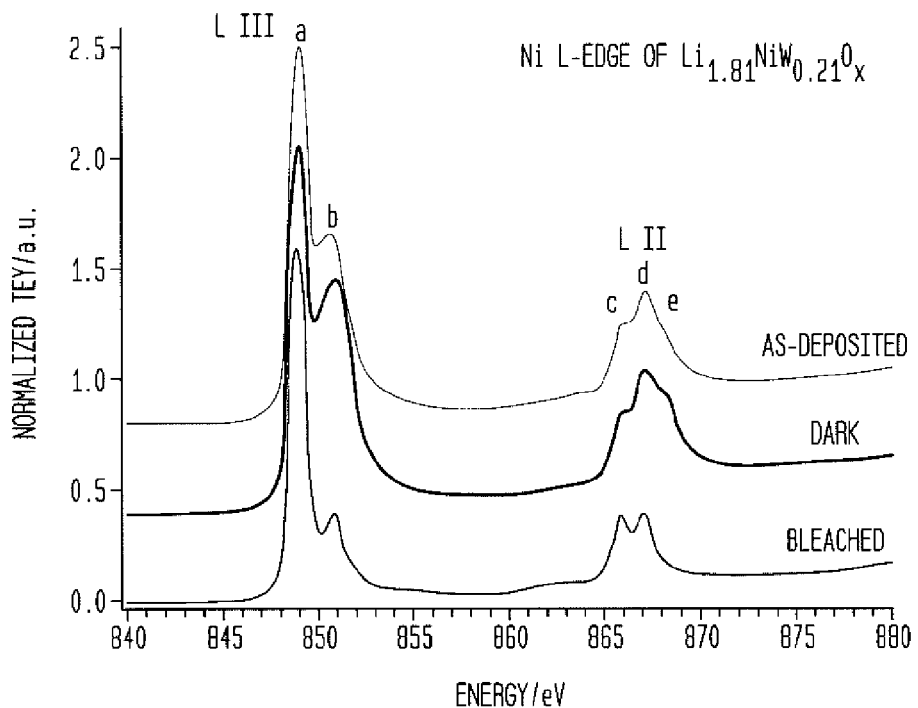
FIGS. 15a and 15b illustrate X-ray absorption spectra for $Li_{1.81}NiW_{0.21}O_x$ materials.
Figure 15B:
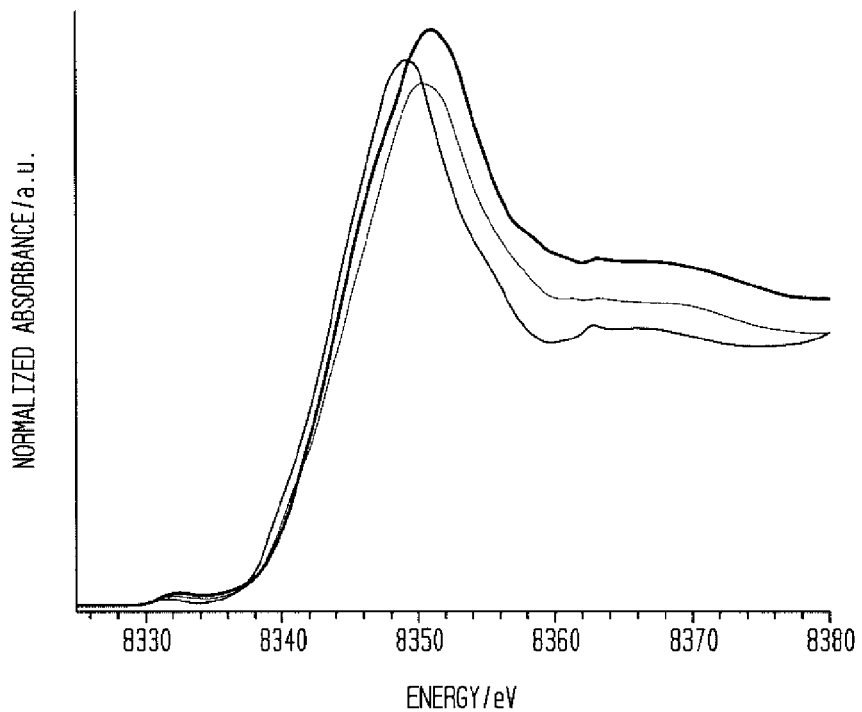

The electrochromic mechanism of nickel oxide-based materials in Li-ion electrolytes has been unclear due to the lack of detailed spectroscopic studies. As shown in FIG. 14a there was minimal difference between the Ni L-edge XAS spectra for the $Li_{2.34}NiZr_{0.28}O_x$ dark-state and as-deposited $Li_{2.34}NiZr_{0.28}O_x$ films. These data were consistent with the presence of high valence state Ni species (i.e., high hole concentration). The Ni L-edge XAS spectrum for the $Li_{2.34}NiZr_{0.28}O_x$ bleached state is shown in FIG. 14a and clearly indicated significant decreases in the intensities of features b and e relative to the dark-state. These results have been interpreted as a neutralization of the initial hole states by electrons from the external circuit leading to the bleached nickel oxide film. The penetration depth of soft X-rays (i.e., Ni L-edge) was limited to about 5 nm. A XAS study of the bulk electronic structure of nickel oxide electronic structure (i.e., Ni K-edge) is shown in FIG. 14b. The pre-edge feature at ca. 8332 eV was attributed to the transition from Ni is to the hybridization state of Ni 3d and O 2p, and it was an indication of oxidation state for the target Ni atom. There are clear shifts in the pre-edge energy and pre-edge absorption between the dark and bleached samples, indicating the formal change of the Ni oxidation state. Therefore, the electrochromic mechanism could be associated with a reversible transformation of formal Ni oxidation states, which was closely related to the well-known Bode mechanism. However, the observed changes in Ni L-edge spectrum (FIG. 14a) indicated that the formal increase of nickel oxidation state was not simply associated with a change from $Ni^{2+}$ to $Ni^{3+}$, but that the increased hole concentration was more localized on the neighboring oxygen, which then impacted the Ni oxidation states through the Ni 3d-O 2p hybridization state. An identical Ni K-edge and Ni L-edge XAS study of $Li_{1.81}NiW_{0.21}O_x$ confirmed that this mechanism was applicable for various nickel oxide-based anodic electrodes in Li-ion electrolytes (FIG. 15).

The CE materials described herein and the methods of depositing these materials allows for high-quality electrochromic films and tunable control of material composition and structure. It is believed that the addition of Li/Zr additives to nickel oxide was found to yield a superior performing electrochromic material in terms of optical modulation, bleached-state transparency and switching kinetics relative to the resulting nickel oxide material with Li/W additives. It is believed that the high specific optical density of $Li_{2.34}NiZr_{0.28}O_x$ allows for increased manufacturability. It is believed that the electrochromic effect in multi-component nickel oxide-based materials arises from the reversible formation of hole states that are localized on the neighboring oxygen orbitals.

EXAMPLE 8

FIG. 2c shows an expanded NiO(II) nanocrystal lattice structure for $Li_{2.34}NiZr_{0.28}O_x$ from High Resolution Cross Sectional Transmission Electron Microscopy (HRXTEM). The crystal structure of the NiO(II) nanocrystals is more open (lattice spacing=0.217 nm for NiO(200) plane) than for undoped Ni(II)O (0.209 nm). The micrograph also reveals that the nanocrystal size is approximately 5 nm.

EXAMPLE 9

Figure 16:
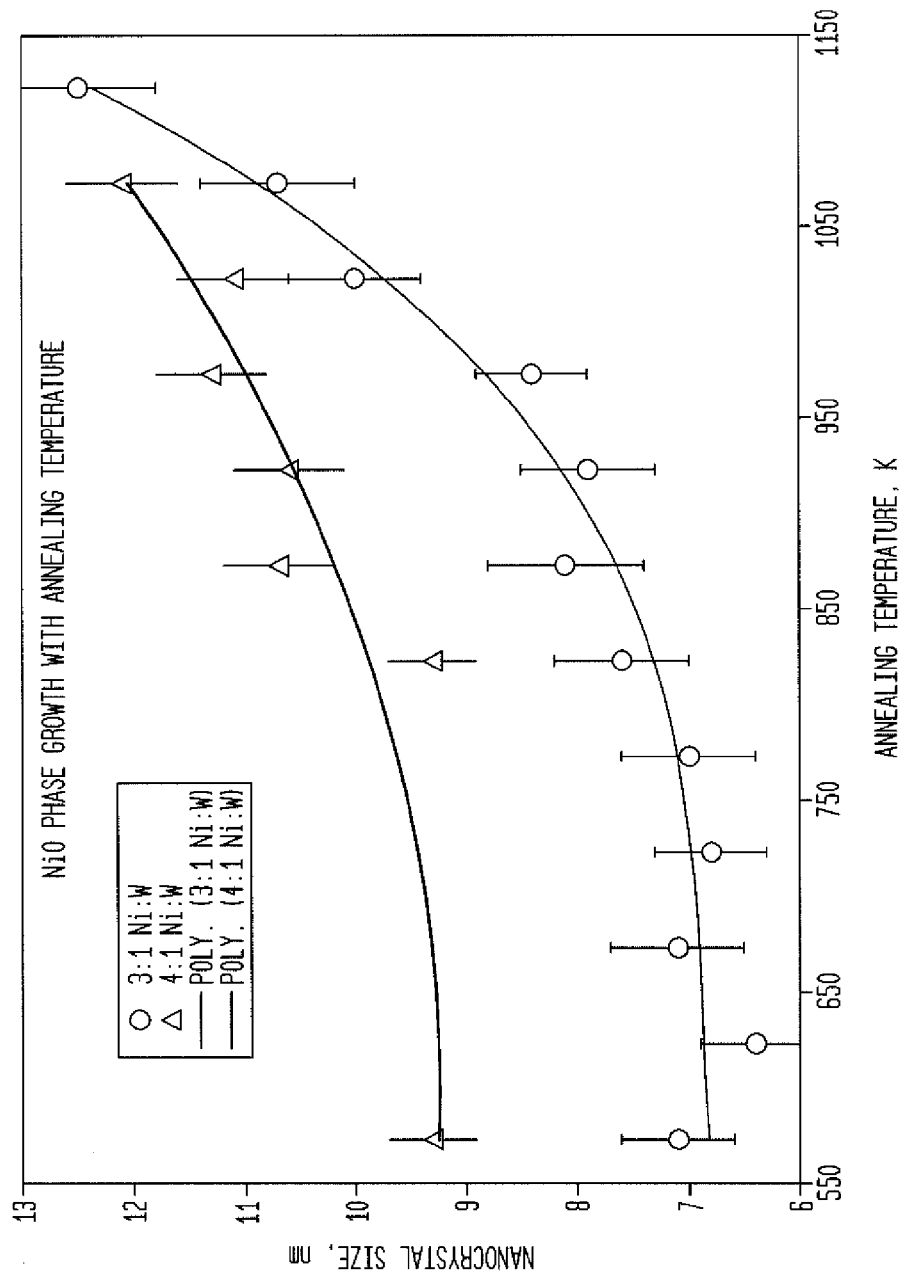
FIG. 16 illustrates a trend in Ni(II)O nanocrystal size for certain materials.

FIG. 16 illustrates the increase in NiO(II) nanocrystal size with higher nickel concentrations ($Li0.0$ $Ni(II)_{0.5}$ $Ni(III)_{0.5}W_{0.25}O_{2.25}$ compared to $Li_{0.0}Ni(II)_{0.5}$ $Ni(III)_{0.5}W_{0.2}O_{2.25}$ from X-ray diffraction. Essentially, it is believed that increasing the nickel to tungsten ratio from about 1:0.33 to about 1:0.25, without lithium, increased the NiO(II) nanocrystal size from about 7 nm to about 9 nm.

Table 1 below illustrates how the amount of surface nickel varies with nano-crystal size. FIG. 1 depicts a nano-crystal with about equal amounts of core and surface material.

TABLE 1

| Nano-crystal Diameter, nm | Nano-crystal Core Volume, nm^3 | Nano-crystal Surface Volume, nm^3 | Nano-crystal Surface/ Core Ratio |
|---|---|---|---|
| 2.1 | 1 | 6 | 5.39 |
| 2.7 | 3 | 9 | 2.92 |
| 3.4 | 8 | 15 | 1.77 |
| 4.6 | 27 | 28 | 1.01 |
| 5.8 | 62 | 44 | 0.70 |
| 7.3 | 138 | 69 | 0.50 |
| 9.1 | 300 | 110 | 0.37 |
| 10.5 | 467 | 144 | 0.31 |
| 11.5 | 637 | 175 | 0.27 |
| 12.4 | 810 | 203 | 0.25 |

It is believed that a high proportion of nickel oxide at the surface of the nano-crystals is advantageous because the surface material is completely accessible to Li+ counter ions. At the surface, switching between dark Ni(III) and bleached Ni(II) is likely to proceed both reversibly and to stoichiometric completion (complete conversion).

The Examples discussed above are provided for purposes of illustration and are not intended to be limiting. Still other embodiments and modifications are also contemplated. While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

The invention claimed is:
1. An electrochromic device comprising:
a first electrode comprising one of an electrochromic layer or a counter electrode layer,
a second electrode comprising other of the electrochromic layer or the counter electrode layer,
an ion-conductor layer for conducting ions between the first and second electrodes,
a first conductive layer, and
a second conductive layer, the first and second electrodes and the ion-conductor layer being sandwiched between the first and second conductive layers,
wherein:
the counter electrode layer comprises at least one mixed oxide having a formula $Li_xNi(II)_{1-y}Ni(III)_yM(A)_zO_a$, where M is a metal other than Li and Ni; A is the most favorable oxidation state of the metal; x and z independently range from greater than 0 to about 10; y is greater than 0 and less than 1; and a ranges from about 0 to about 10; and
a thickness of the counter electrode layer is determined by the formula (2*d*y)/(x+z), where d is the thickness of the electrochromic layer, and x, y, and z correspond to the mixed oxide constituting the counter electrode layer.
2. The electrochromic device of claim 1, wherein the mixed oxide is wherein the compound is $Li_{2.3}Ni(II)_{(0.5)}Ni(III)_{(0.5)}Zr_{0.29}O_{2.73}$.

3. The electrochromic device of claim 1, wherein the mixed oxide is selected from a material that has a refractive index ranging from about 1.7 to about 2.5.

4. The electrochromic device of claim 1, wherein the mixed oxide is selected from a material that has a band gap energy ranging from about 2.5 eV to about 6 eV.

5. The electrochromic device of claim 1, wherein M(A) is Zr(IV), Hf(IV), or W(VI).

6. The electrochromic device of claim 1, wherein x ranges from about 1.5 to about 3.

7. The electrochromic device of claim 1, wherein y ranges from about 0.4 to about 0.95.

8. The electrochromic device of claim 1, wherein z ranges from about 0.05 to about 2.

9. The electrochromic device of claim 1, wherein the thickness of the counter electrode layer is in a range from about 80 nm to about 500 nm.

10. An electrochromic device comprising:
a first electrode comprising one of an electrochromic layer or a counter electrode layer,
a second electrode comprising other of the electrochromic layer or the counter electrode layer,
an ion-conductor layer for conducting ions between the first and second electrodes, a first conductive layer, and a second conductive layer, the first and second electrodes and the ion-conductor layer being sandwiched between the first and second conductive layers,
wherein the counter electrode layer comprises at least one mixed oxide having a formula $Li_xNi(II)_{1-y}Ni(III)_yM_zO_a$, where M is a metal other than Li and Ni; x ranges from greater than 0 to about 10; y is greater than 0 and less than 1; z ranges from greater than 0 to about 10; and a is from about $(0.5x+1+0.5y+z)$ to about $(0.5x+1+0.5y+3.5z)$.

11. The electrochromic device of claim 10, wherein:
M is selected from the group consisting of Al, Sc, Cr, Co, Y, Rh, In, La, Ce, Nd, and Sm; and
a is $(1+0.5x+0.5y+1.5z)$.

12. The electrochromic device of claim 10, wherein:
M is selected from the group consisting of Si, Ti, Mn, Zr, Sn, Ce, Hf, Re, and Ir; and
a is $(1+0.5x+0.5y+2z)$.

13. The electrochromic device of claim 12, wherein M is Zr or Hf.

14. The electrochromic device of claim 10, wherein:
M is selected from the group consisting of V, Nb, Sb, Ta, and Pa; and
a is $(1\ 0.5x+0.5y+5z)$.

15. The electrochromic device of claim 10, wherein:
M is selected from the group consisting of Cr, Se, Mo, Te, and W; and
a is $(1+0.5x+0.5y+3z)$.

16. The electrochromic device of claim 15, where M is W.

17. The electrochromic device of claim 10, wherein x ranges from about 1.5 to about 3.

18. The electrochromic device of claim 10, wherein y ranges from about 0.4 to about 0.95.

19. The electrochromic device of claim 10, wherein z ranges from about 0.15 to about 1.

20. The electrochromic device of claim 10, wherein x ranges from about 1.81 to about 2.5, y ranges from about 0.6 to about 0.9, and z ranges from about 0.2 to about 0.5.

* * * * *